United States Patent [19]

Glowczewski

[11] Patent Number: 4,901,561

[45] Date of Patent: Feb. 20, 1990

[54] THROTTLE POSITION SENSOR DATA SHARED BETWEEN CONTROLLERS WITH DISSIMILAR GROUNDS

[75] Inventor: Thomas Glowczewski, Washington Township, Macomb County, Mich.

[73] Assignee: Chrysler Motors Corporation, Highland Park, Mich.

[21] Appl. No.: 188,612

[22] Filed: Apr. 29, 1988

[51] Int. Cl.⁴ .......................................... G01M 15/00
[52] U.S. Cl. ...................... 73/118.1; 74/866
[58] Field of Search ................. 73/118.1, 116; 74/752 A, 854, 866; 330/69

[56] References Cited

U.S. PATENT DOCUMENTS

| | | | |
|---|---|---|---|
| 3,631,744 | 1/1972 | Blomquist | 74/868 |
| 3,876,028 | 4/1975 | Asano et al. | 180/70 R |
| 3,881,368 | 5/1975 | Furuhashi et al. | 74/866 |
| 3,882,740 | 5/1975 | Forster et al. | 74/866 |
| 3,895,547 | 7/1975 | Nohira et al. | 74/844 |
| 3,942,393 | 3/1976 | Forster et al. | 74/866 |
| 3,956,947 | 5/1976 | Leising et al. | 74/866 |
| 4,044,634 | 8/1977 | Florus et al. | 74/866 |
| 4,061,055 | 12/1977 | Iizuka et al. | 74/866 |
| 4,073,204 | 2/1978 | Dick | 74/866 |
| 4,082,013 | 4/1978 | Dornfeld et al. | 74/866 |
| 4,085,379 | 4/1978 | Kubach et al. | 330/69 |
| 4,131,036 | 12/1978 | Ivey et al. | 74/866 |
| 4,174,645 | 11/1979 | Ohmae et al. | 74/866 |
| 4,208,925 | 6/1980 | Miller et al. | 74/866 |
| 4,220,058 | 9/1980 | Petzold | 74/751 |
| 4,244,244 | 1/1981 | Rembold et al. | 74/866 |
| 4,258,252 | 8/1981 | Yamaki et al. | 74/866 |
| 4,258,591 | 3/1981 | Eckert et al. | 74/866 |
| 4,259,882 | 4/1981 | Miller | 74/862 |
| 4,283,970 | 8/1981 | Vukovich | 74/866 |
| 4,289,048 | 9/1981 | Mikel et al. | 74/733 |
| 4,290,322 | 9/1981 | Huitema | 74/752 A |
| 4,338,966 | 7/1982 | Smith | 137/596.17 |
| 4,345,489 | 8/1982 | Muller et al. | 74/752 A |
| 4,485,443 | 11/1984 | Knodler et al. | 364/424.1 |
| 4,527,448 | 7/1985 | Person et al. | 74/869 |
| 4,535,412 | 8/1985 | Cederquist | 364/511 |
| 4,602,603 | 7/1986 | Honkanen et al. | 123/416 |
| 4,612,638 | 9/1986 | Kissel | 371/15 |
| 4,631,628 | 12/1986 | Kissel | 361/154 |
| 4,637,361 | 1/1987 | Killen et al. | 123/339 |
| 4,667,540 | 5/1987 | Yagi | 74/866 |
| 4,680,988 | 7/1987 | Mori | 74/866 |
| 4,693,142 | 9/1987 | Kurihara et al. | 74/861 |
| 4,706,082 | 11/1987 | Miesterfeld et al. | 340/825.5 |
| 4,719,458 | 1/1988 | Miesterfeld et al. | 340/825.5 |
| 4,724,723 | 2/1988 | Lockhart et al. | 74/854 |
| 4,739,323 | 4/1988 | Miesterfeld et al. | 340/825.5 |
| 4,739,324 | 4/1988 | Miesterfeld et al. | 340/825.5 |

OTHER PUBLICATIONS

Miesterfeld, F. O. R. Chrysler Collision . . . Network SAE Technical Paper, No. 860389, Feb. 28, 1986.

Primary Examiner—Jerry W. Myracle
Attorney, Agent, or Firm—Mark P. Calcaterra

[57] ABSTRACT

A circuit for throttle position sensor data shared between controller with dissimilar grounds and to provide reading the output of the throttle position sensor with one of the controllers by referencing the output to the ground of that controller to generate an absolute throttle position sensor reading; and reading the output of the throttle position sensor with another controller via a differential amplifier to generate a relative throttle position sensor reading.

3 Claims, 16 Drawing Sheets

THROTTLE POSITION SENSOR DATA SHARED BETWEEN CONTROLLERS WITH DISSIMILAR GROUNDS

BACKGROUND OF THE INVENTION

1. Field Of The Invention

A circuit for throttle position sensor data shared between controller with dissimilar grounds and to provide reading the output of the throttle position sensor with one of the controllers by referencing the output to the ground of that controller to generate an absolute throttle position sensor reading; and reading the output of the throttle position sensor with another controller via a differential amplifier to generate a relative throttle position sensor reading.

2. Description Of Related Art

Generally speaking, land vehicles require three basic components. These components comprise a power plant (such as an internal combustion engine) a power train and wheels. The internal combustion engine produces force by the conversion of the chemical energy in a liquid fuel into the mechanical energy of motion (kinetic energy). The function of the power train is to transmit this resultant force to the wheels to provide movement of the vehicle.

The power train's main component is typically referred to as the "transmission". Engine torque and speed are converted in the transmission in accordance with the tractive-power demand of the vehicle. The vehicle's transmission is also capable of controlling the direction of rotation being applied to the wheels, so that the vehicle may be driven both forward and backward.

A conventional transmission includes a hydrodynamic torque converter to transfer engine torque from the engine crankshaft to a rotatable input member of the transmission through fluid-flow forces. The transmission also includes frictional units which couple the rotating input member to one or more members of a planetary gearset. Other frictional units, typically referred to as brakes, hold members of the planetary gearset stationary during flow of power. These frictional units are usually brake clutch assemblies or band brakes. The drive clutch assemblies can couple the rotating input member of the transmission to the desired elements of the planetary gearsets, while the brakes hold elements of these gearsets stationary. Such transmission systems also typically provide for one or more planetary gearsets in order to provide various ratios of torque and to ensure that the available torque and the respective tractive power demand are matched to each other.

Transmissions are generally referred to as manually actuated or automatic transmissions. Manual transmissions generally include mechanical mechanisms for coupling rotating gears to produce different ratio outputs to the drive wheels.

Automatic transmissions are designed to take automatic control of the frictional units, gear ratio selection and gear shifting. A thorough description of general automatic transmission design principals may be found in "Fundamentals of Automatic Transmissions and Transaxles," Chrysler Corporation Training Manual No. TM-508A. Additional descriptions of automatic transmissions may be found in U.S. Pat. No 3,631,744, entitled "Hydromatic Transmission," issued Jan. 4, 1972 to Blomquist, et al., and U.S. Pat. No. 4,289,048, entitled "Lock-up System for Torque Converter," issued on Sept. 15, 1981 to Mikel, et al. Each of these patents is hereby incorporated by reference.

In general, the major components featured in such an automatic transmission are: a torque converter as above-mentioned; fluid pressure-operated multi-plate drive or brake clutches and/or brake bands which are connected to the individual elements of the planetary gearsets in order to perform gear shifts without interrupting the tractive power, one-way clutches in conjunction with the frictional units for optimization of power shifts; and transmission controls such as valves for applying and releasing elements to shift the gears (instant of shifting), for enabling shifting, and for choosing the proper gear (shift point control), dependent on shift-program selection by the driver (selector lever), accelerator position, the engine condition and vehicle speed.

The control system of the automatic transmission is typically hydraulically operated through the use of several valves to direct and regulate the supply of pressure. This hydraulic pressure control will cause either the actuation or deactuating of the respective frictional units for effecting gear changes in the transmission. The valves used in the hydraulic control circuit typically comprise spring-biased spool valves, spring-biased accumulators and ball check valves. Since many of these valves rely upon springs to provide a predetermined amount of force, it will be appreciated that each transmission design represents a finely tuned arrangement of interdependent valve components. While this type of transmission control system has worked well over the years, it does have its limitations. For example, such hydraulically controlled transmissions are generally limited to one or a very small number of engines and vehicle designs. Therefore, considerable cost is incurred by an automobile manufacturer to design, test, build, inventory and repair several different transmission units in order to provide an acceptable broad model line for consumers.

Additionally, it should be appreciated that such hydraulically controlled transmission systems cannot readily adjust themselves in the field to compensate for varying conditions such as normal wear on the components, temperature swings and changes in engine performance over time. While each transmission is designed to operate most efficiently within certain specific intolerances, typical hydraulic control systems are incapable of taking self-corrective action on their own to maintain operation of the transmission at peak efficiency.

However, in recent years, a more advanced form of transmission control system has been proposed, which would offer the possibility of enabling the transmission to adapt itself to changing conditions. In this regard, U.S. Pat. No. 3,956,947, issued on May 18, 1976 to Leising, et al., which is hereby incorporated by reference, sets forth a fundamental development in this field. Specifically, this patent discloses an automatic transmission design which featues an "adaptive" control system that includes electrically operated solenoid-actuated valves for controlling certain fluid pressures. In accordance with this electric/hydraulic control system, the automatic transmission would be "responsive" to an acceleration factor for controlling the output torque of the transmission during a shift from one ratio of rotation (between the input and output shafts of the transmission) to another. Specifically, the operation of the solenoid-actuated valves would cause a rotational speed versus time curve of a sensed rotational component of the transmission to substantially follow along a predetermined path during shifting.

3. Objects Of The Present Invention

It is a more specific object of the subject invention to provide a circuit for throttle position sensor data shared between controller with dissimilar grounds.

It is a still more specific object to provide a circuit to read the output of the throttle position sensor with one of the controllers by referencing the output to the ground of that controller to generate an absolute throttle position sensor reading; and reading the output of the throttle position sensor with another controller via a differential amplifier to generate a relative throttle position sensor reading.

This application is one of several applications filed on the same data, all commonly assigned and having similar Specifications and Drawings, these applications being identified below.

| Ser. No. | Title |
|---|---|
| 187,772 | AN ELECTRONICALLY-CONTROLLED, ADAPTIVE AUTOMATIC TRANSMISSION SYSTEM |
| 187,751 | AUTOMATIC FOUR-SPEED TRANSMISSION |
| 189,493 | PUSH/PULL CLUTCH APPLY PISTON OF AN AUTOMATIC TRANSMISSION |
| 187,781 | SHARED REACTION PLATES BETWEEN CLUTCH ASSEMBLIES IN AN AUTOMATIC TRANSMISSION |
| 189,492 | CLUTCH REACTION AND PRESSURE PLATES IN AN AUTOMATIC TRANSMISSION |
| 188,602 | BLEEDER BALL CHECK VALVES IN AN AUTOMATIC TRANSMISSION |
| 188,610 | PRESSURE BALANCED PISTONS IN AN AUTOMATIC TRANSMISSION |
| 189,494 | DOUBLE-ACTING SPRING IN AN AUTOMATIC TRANSMISSION |
| 188,613 | PARK LOCKING MECHANISM FOR AN AUTOMATIC TRANSMISSION |
| 189,770 | SOLENOID-ACTIVATED VALVE ARRANGEMENT OF AN AUTOMATIC TRANSMISSION SYSTEM |
| 187,796 | RECIPROCATING VALVES IN A FLUID SYSTEM OF AN AUTOMATIC TRANSMISSION |
| 187,705 | VENT RESERVOIR IN A FLUID SYSTEM OF AN AUTOMATIC TRANSMISSION |
| 188,592 | FLUID ACTUATED SWITCH VALVE IN AN AUTOMATIC TRANSMISSION |
| 188,598 | DIRECT-ACTING, NON-CLOSE CLEARANCE SOLENOID-ACTUATED VALVES |
| 188,618 | NOISE CONTROL DEVICE FOR A SOLENOID-ACTUATED VALVE |
| 188,605 | FLUID ACTUATED PRESSURE SWITCH FOR AN AUTOMATIC TRANSMISSION |
| 187,210 | METHOD OF APPLYING REVERSE GEAR OF AN AUTOMATIC TRANSMISSION |
| 187,672 | TORQUE CONVERTER CONTROL VALVE IN A FLUID SYSTEM OF AN AUTOMATIC TRANSMISSION |
| 187,120 | CAM-CONTROLLED MANUAL VALVE IN AN AUTOMATIC TRANSMISSION |
| 187,181 | FLUID SWITCHING MANUALLY BETWEEN VALVES IN AN AUTOMATIC TRANSMISSION |
| 187,704 | METHOD OF OPERATING AN ELECTRONIC AUTOMATIC TRANSMISSION SYSTEM |
| 188,020 | METHOD OF SHIFT SELECTION IN AN ELECTRONIC AUTOMATIC TRANSMISSION SYSTEM |
| 187,991 | METHOD OF UNIVERSALLY ORGANIZING SHIFTS FOR AN ELECTRONIC AUTOMATIC TRANSMISSION SYSTEM |
| 188,603 | METHOD OF DETERMINING AND CONTROLLING THE LOCK-UP OF A TORQUE CONVERTER IN AN ELECTRONIC AUTOMATIC TRANSMISSION SYSTEM |
| 188,617 | METHOD OF ADAPTIVELY IDLING AN ELECTRONIC AUTOMATIC TRANSMISSION SYSTEM |

-continued

| Ser. No. | Title |
|---|---|
| 189,553 | METHOD OF DETERMINING THE DRIVER SELECTED OPERATING MODE OF AN AUTOMATIC TRANSMISSION SYSTEM |
| 188,615 | METHOD OF DETERMINING THE SHIFT LEVER POSITION OF AN ELECTRONIC AUTOMATIC TRANSMISSION SYSTEM |
| 188,837, now standard | METHOD OF DETERMINING THE ACCELERATION OF A TURBINE IN AN AUTOMATIC TRANSMISSION |
| 187,771 | METHOD OF DETERMINING THE FLUID TEMPERATURE OF AN ELECTRONIC AUTOMATIC TRANSMISSION SYSTEM |
| 188,607 | METHOD OF DETERMINING THE CONTINUITY OF SOLENOIDS IN AN ELECTRONIC AUTOMATIC TRANSMISSION SYSTEM |
| 189,579 | METHOD OF DETERMINING THE THROTTLE ANGLE POSITION FOR AN ELECTRONIC AUTOMATIC TRANSMISSION SYSTEM |
| 188,604 | METHOD OF CONTROLLING THE SPEED CHANGE OF A KICKDOWN SHIFT FOR AN ELECTRONIC AUTOMATIC TRANSMISSION SYSTEM |
| 188,591 | METHOD OF CONTROLLING THE APPLY ELEMENT DURING A KICKDOWN SHIFT FOR ELECTRONIC AUTOMATIC TRANSMISSION SYSTEM |
| 188,608 | METHOD OF CALCULATING TORQUE FOR AN ELECTRONIC AUTOMATIC TRANSMISSION SYSTEM |
| 187,150 | METHOD OF LEARNING FOR ADAPTIVELY CONTROLLING AN ELECTRONIC AUTOMATIC TRANSMISSION SYSTEM |
| 188,595 | METHOD OF ACCUMULATOR CONTROL FOR A FRICTION ELEMENT IN AN ELECTRONIC AUTOMATIC TRANSMISSION SYSTEM |
| 188,599 | METHOD OF ADAPTIVELY SCHEDULING A SHIFT FOR AN ELECTRONIC AUTOMATIC TRANSMISSION SYSTEM |
| 199,601 | METHOD OF SHIFT CONTROL DURING A COASTDOWN SHIFT FOR AN ELECTRONIC AUTOMATIC TRANSMISSION SYSTEM |
| 188,620 | METHOD OF TORQUE PHASE SHIFT CONTROL FOR AN ELECTRONIC AUTOMATIC TRANSMISSION |
| 188,596 | METHOD OF DIAGNOSTIC PROTECTION FOR AN ELECTRONIC AUTOMATIC TRANSMISSION SYSTEM |
| 188,597 | METHOD OF STALL TORQUE MANAGEMENT FOR AN ELECTRONIC AUTOMATIC TRANSMISSION SYSTEM |
| 188,606 | METHOD OF SHIFT TORQUE MANAGEMENT FOR AN ELECTRONIC AUTOMATIC TRANSMISSION SYSTEM |
| 188,616 | ELECTRONIC CONTROLLER FOR AN AUTOMATIC TRANSMISSION |
| 188,600 | DUAL REGULATOR FOR REDUCING SYSTEM CURRENT DURING AT LEAST ONE MODE OF OPERATION |
| 188,619 | UTILIZATION OF A RESET OUTPUT OF A REGULATOR AS A SYSTEM LOW-VOLTAGE INHIBIT |
| 188,593 | THE USE OF DIODES IN AN INPUT CIRCUIT TO TAKE ADVANTAGE OF AN ACTIVE PULL-DOWN NETWORK PROVIDED IN A DUAL REGULATOR |
| 188,669 | SHUTDOWN RELAY DRIVER CIRCUIT |
| 188,614 | CIRCUIT FOR DETERMINING THE CRANK POSITION OF AN IGNITION SWITCH BY SENSING THE VOLTAGE ACROSS THE STARTER RELAY CONTROL AND HOLDING AN ELECTRONIC DEVICE IN A RESET CONDITION IN RESPONSE THERETO |
| 188,611 | NEUTRAL START SWITCH TO SENSE SHIFT LEVER POSITION |
| 188,981 | OPEN LOOP CONTROL OF SOLENOID COIL |

| Ser. No. | Title |
|---|---|
| | -continued |
| | DRIVER |

Commonly assigned application Ser. No. 07/187,772, filed Apr. 29, 1988, now U.S. Pat. No. 4,875,391 has been printed in its entirety. The Figures and the entire Specification of that patent are specifically incorporated by reference. For a description of the above copending applications, reference is made to the above mentioned patent, U.S. Pat. No. 4,875,391.

SUMMARY OF THE INVENTION

To provide a circuit for throttle position sensor data shared between controller with dissimilar grounds.

To read the output of the throttle position sensor with one of the controllers by referencing the output to the ground of that controller to generate an absolute throttle position sensor reading; and reading the output of the throttle position sensor with another controller via a different amplifier to generate a relative throttle position sensor reading.

BRIEF DESCRIPTION OF THE DRAWINGS

Other objects, features and advantages of the present invention will become more fully apparent from the following detailed description of the preferred embodiment, the appended claims and in the accompanying drawings in which:

FIG. 27B is a block diagram of the transmission controller for the adaptive control according to the present invention;

FIG. 28A illustrates a communication circuit which provides a serial communication link between the transmission controller and the engine controller; FIG. 28B illustrates the microprocessor and peripheral interface circuits; FIG. 28C illustrates the read only memory and watchdog/reset circuits; FIG. 28D illustrates the speed and throttle input circuits; FIG. 28E illustrates the ignition switch input circuits; FIG. 28F illustrates the regulator and relay driver circuits; FIG. 28G illustrates the solenoid driver circuits; FIG. 28H illustrates the pressure switch input and test mode circuits; and FIG. 28I illustrates two additional communication circuits for the transmission controller;

ELECTRONIC CONTROLLER FOR AN AUTOMATIC TRANSMISSION

Figure 27A:
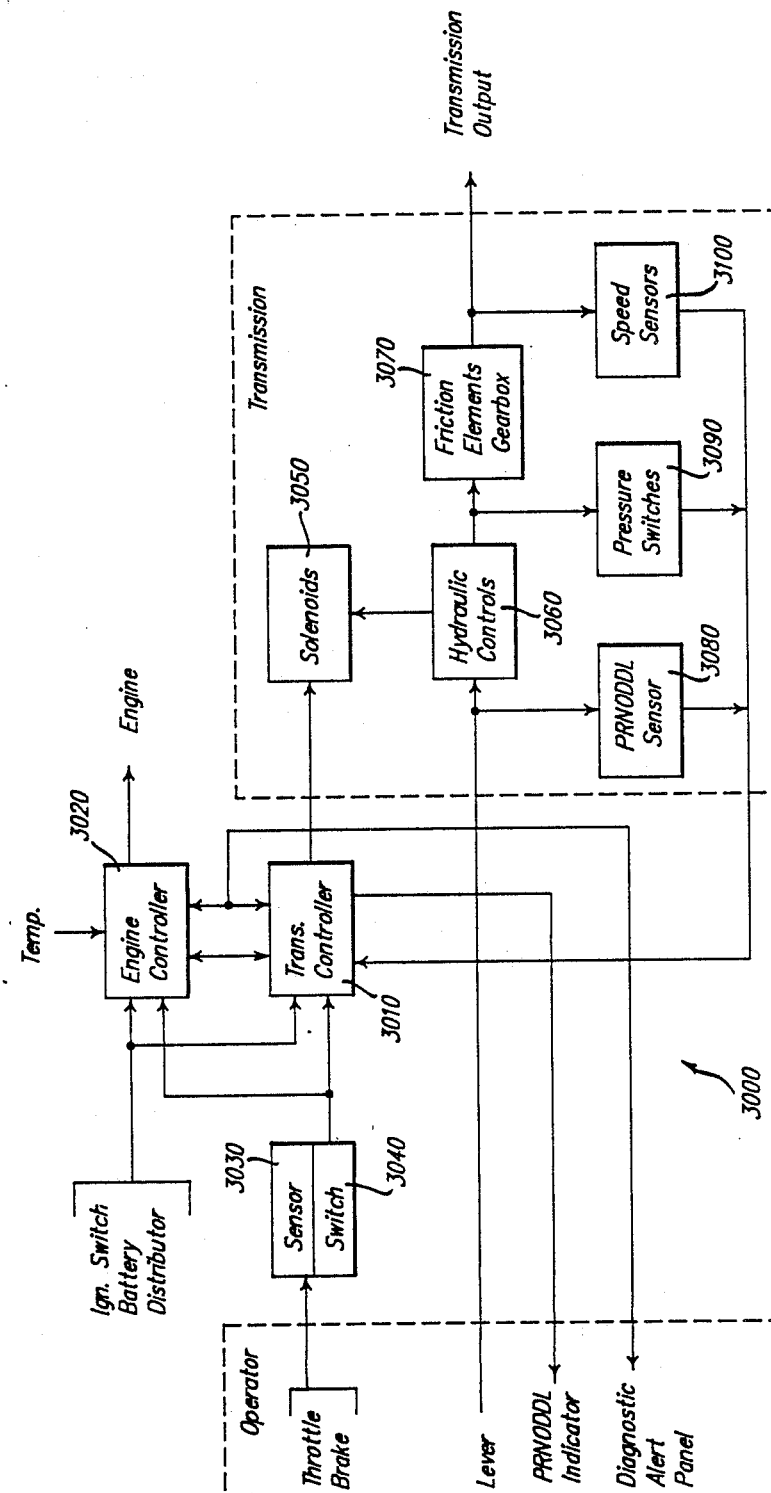
FIG. 27A is a block diagram of an adaptive control system for an automatic transmission according to the present invention.
Figure 2T:
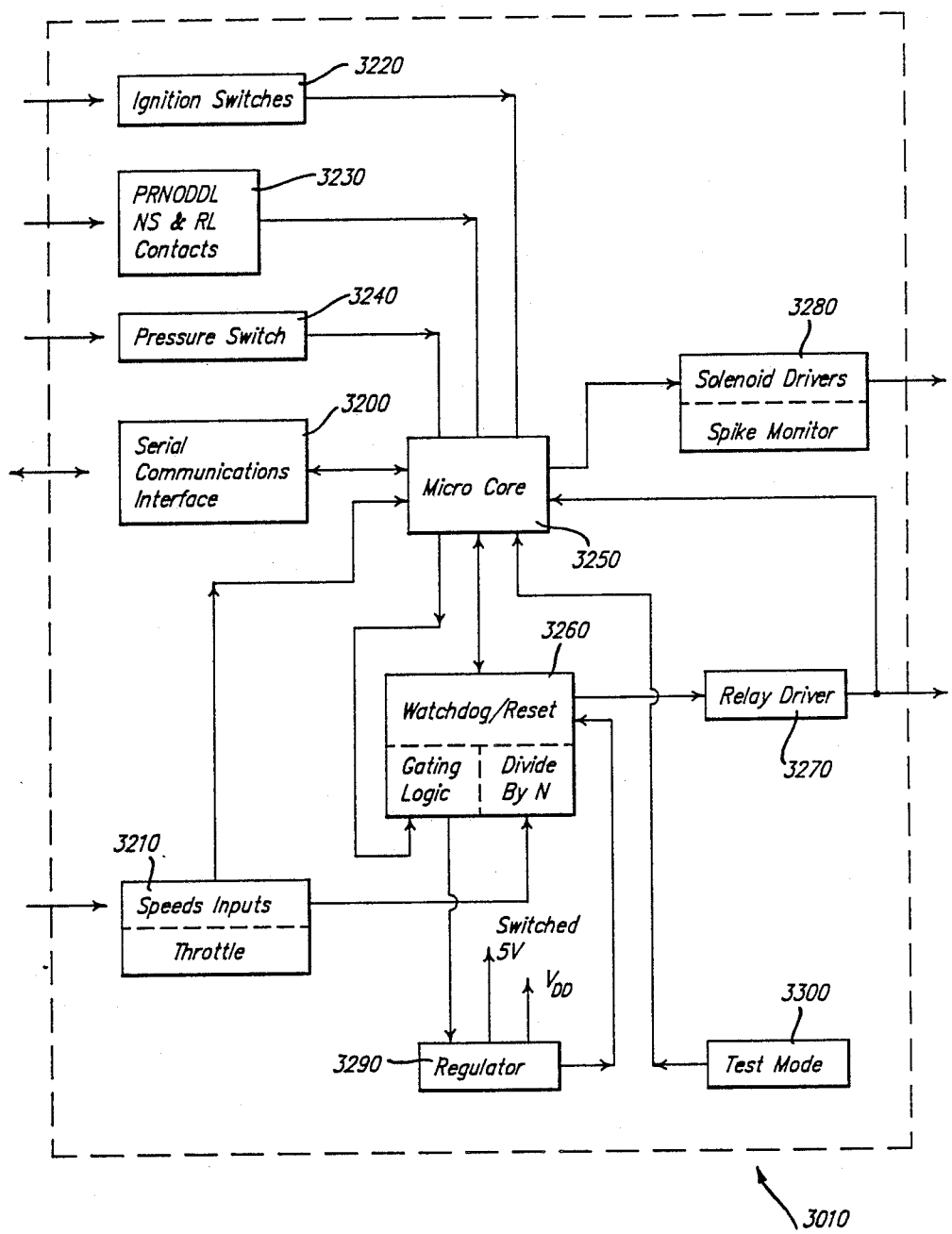

Referring to FIG. 27B, a block diagram of the transmission controller 3010 is shown. The first block is the serial communication interface 3200 which has as its function to provide a serial communications link with the engine controller 3020. This serial communication interface 3200 could also be used to provide a serial communication link with other appropriate microcomputer-based controllers in the vehicle. It should also be understood that a parallel communication could also be used in the appropriate applications.

In the present invention, the serial communications interface 3200 utilizes the multiplexing protocol and interface technology of the Chrysler Collision Detection ("C$^2$D") Serial Data Bus. This technology is described in the co-assigned U.S. Pat. No. 4,706,082, entitled "Serial Data Bus For Intermodule Data Communications," which issued on Nov. 10, 1987; and U.S. Pat. No. 4,719,458, entitled "Method Of Data Arbitration And Collision Detection In A Data Bus," which issued on Jan. 12, 1988; and U.S. Pat. No. 4,739,323, entitled "Serial Data Bus For Serial Communication Interface (SCI), Serial Peripheral Interface (SPI) and Buffered SPI Modes of Operation," which issued on Apr. 19, 1988; and U.S. Pat. No. 4,739,324, entitled "Method for Serial Peripheral Interface (SPI) in a Serial Data Bus," which issued on Apr. 19, 1988; and U.S. Pat. No. 4,742,349, entitled "Method for Buffered Serial Peripheral Interface (SPI) in a Serial Data Bus," which will issue on May 3, 1988; and in SAE paper No. 860389, entitled "Chrysler Collision Detection (C$^2$D)—A Revolutionary Vehicle Network," by Frederick O. R. Miesterfield, 1986. These patents and documents are all hereby incorporated by reference.

Another function for the serial communications interface 3200 is to provide a diagnostic interface with the transmission controller 3010 so that service information can be provided to a technician as a troubleshooting or maintenance aid. Still another function of the serial communications interface 3200 is to provide a convenient data or program access route for in-plant testing of the transmission controller 3010 during the manufacturing process.

The transmission controller 3010 also includes several other interface circuits which are used to receive and condition input signals from the various sensors identified above. For example, the transmission controller 3010 includes a block 3210 which contains the interface circuits used to receive signals from the speed sensors 3100 and the throttle sensor 3030. The transmission input speed signal represents the turbine speed $N_t$ of the torque converter 110, while the output speed signal represents the output speed $N_o$ of the vehicle. As described above, both of these signals are generated by variable reluctance pick-ups (e.g., speed sensors 320 and 526). The engine speed is also sensed by a suitable sensor, such as a hall effect pick-up in the distributor of the engine. This technology is described in co-assigned U.S. Pat. No. 4,602,603, entitled "Ignition Distributor-Hall Effect Sensor Switching System and Method," which issued on July 29, 1986 which is hereby incorporated by reference.

The function of block 3210 is to provide input signal conditioning, filtering and conversion of the speed sensor signals to digital logic levels. In this regard, block 3210 also includes an interface circuit for the throttle position sensor 3030. Once this signal is properly conditioned, this information may be shared with the engine controller 3020. The throttle position sensor 3030 will give an indication as to which angular position the throttle blade (means) is in within the throttle body. As with other appropriate input signals, the throttle position sensor signal is conditioned and fed through a unity gain differential amplifier to provide isolation, as will be described below.

The transmission controller 3010 also includes blocks 3220 and 3230 which represents the interface circuits used to receive various input signals related to the engine ignition and PRNODDL condition. Specifically, the ignition related signals include a signal J2, and a signal S2. The signals related to the PRNODDL condition include the "neutral start" signal $NS_1$, and "auxiliary neutral start" signal $NS_2$, a "first reverse light" signal $RL_1$ and a "second reverse light" signal $RL_2$. In accordance with the preferred embodiment, the control methodology is responsive to the condition that these ignition switch voltage signals are in. The reason for this is that it is appropriate to hold the transmission controller 3010 in certain predetermined conditions depending on the position of the ignition switch and/or the neutral contact switch sensor $NS_1$ and/or the auxiliary contact switch sensor $NS_2$.

For example, the signal J2 represents the ignition voltage during the run and crank position, and this signal will generally be either at a zero voltage level or at the battery voltage level. The signal S2 represents the voltage in the crank position only and is used to provide the necessary voltage for the starter relayy coil of the engine. To determine when the transmission 100 is in a crank condition the $NS_1$ or neutral start switch signal is sensed along with the S2 signal to hold the transmission controller 3010 in a reset condition during cranking due to the possibility that the battery voltage may drop below level required for proper controller operation.

Referring specifically to block 3230, the PRNODDL condition switches provide input signals from the contact switch sensor $NS_1$, the auxiliary contact switch sensor $NS_2$, the first reverse light $RL_1$ and the second reverse light $RL_2$. The PRNODDL switch block 3230 controls the switching of the reverse lights which are connected in series. When the signals $RL_1$ and $RL_2$ indicate a reverse condition, electrical current from the ignition switch J2 is fed through a relay coil which interconnects the reverse lights to battery voltage via the relay contacts thus turning on the backup lights on the vehicle. The PRNODDL switch block also acts is combination with the two contact switch sensors $NS_1$ and $NS_2$ to determine the shift lever position, as discussed above.

As shown in FIG. 27B, the transmission controller 3010 includes a pressure switch block 3240 which represents the interface circuit used for receiving and conditioning the pressure level signals from the pressure switches 3090. Each of the pressure switches provide a digital level signal which is either at a zero or battery voltage level depending upon whether or not a predetermined pressure level has been reached. The pressure switches are used in conjunction with the low/reverse, overdrive and two/four shift (kickdown) clutch assmblies, and generally comprise grounding switches located in the manifold assembly 700. The pressure switch interface circuit 3240 provides input signal conditioning, i.e. filtering and buffering for these signals. For example, pull up resistors located in the manifold assembly 700 (See FIG. 8) to provide battery voltage when pressure switch is open are contained in block 3090. The state of each of the pressure switch signals is transmitted to the transmission controller 3010 to provide feedback information for use in both monitoring clutch operation and as an input to the learning logic and methodology described herein.

The heart of the transmission controller 3010 is contained in the micro core block 3250. The micro core 3250 includes an eight-bit microcomputer unit (MCU), a memory chip for storing the application or operating program used by the MCU, and an interface chip for addressing and routing signals on the various lines used in the micro core bus structure. Thus, for example, several of the signals received from the controller's interface circuits are connected to the interface chip, which will then place these signals on the data bus when the chip is properly addressed by the MCU.

The transmission controller 3010 also includes a watchdog/reset block 3260 which provides several circuit function in conjunction with the micro core 3250. For example, the watchdog/reset circuits 3260 will control the initial start up of the MCU, watch to see if the MCU is properly functioning, cause a reset of the MCU in response to certain regulator voltage conditions, and provide a frequency divider for the speed signals. The watchdog/reset circuits 3260 also provide an output to a relay driver block 3270 which is used to disconnect or turn off electrical power to the solenoid-actuated valves 630, 632, 634 and 636 in the solenoid block 3050 shown in FIG. 27A under predetermined conditions.

One of the principal functions of the micro core 3250 is to generate command or control signals for transmission 100 to the solenoid driver block 3280. The solenoid driver block includes a separate driver circuit for the solenoid-actuated valves 630, 632, 634 and 636 contained in the solenoid block 3050 shown in FIG. 27A. These driver circuits generate the electrical current necessary to operate the solenoid-actuated valves 630, 632, 634 and 636 in response to the control signals generated by the MCU. The solenoid driver block 3280 also includes spike monitor circuits which verify the operation of the solenoid driver circuits by detecting the presence of an inductive spike (FIG. 22E) which occurs when the solenoid coil is de-energized.

The transmission controller 3010 also includes a regulator block 3290 and a test mode block 3300. The regulator block 3290 is used to advise the watchdog/reset circuit 3260 of predetermined conditions relating to the operation of the regulator, such as a low battery voltage condition, a high battery voltage condition, an overload condition, or an over temperature condition in the regulator. It is a dual regulator and includes a 5 V, switched output. The test mode block 3300 is used to permit a test mode program to be downloaded into the RAM memory of the MCU for testing the transmission system.

Figure 28A:
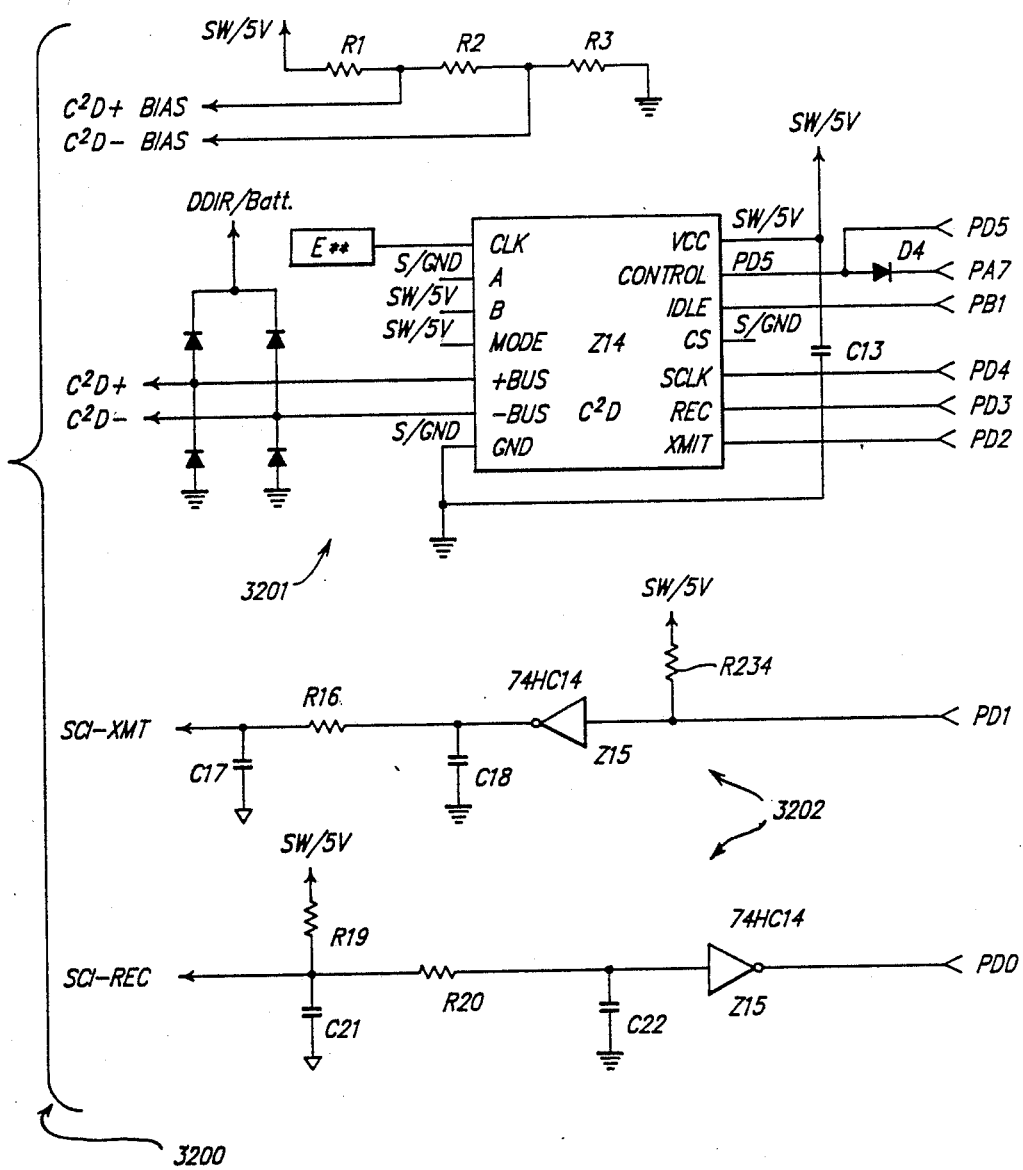
FIGS. 28A-I comprise a schematic diagram of the transmission controller shown in FIG. 27B; specifically.
Figure 28B:
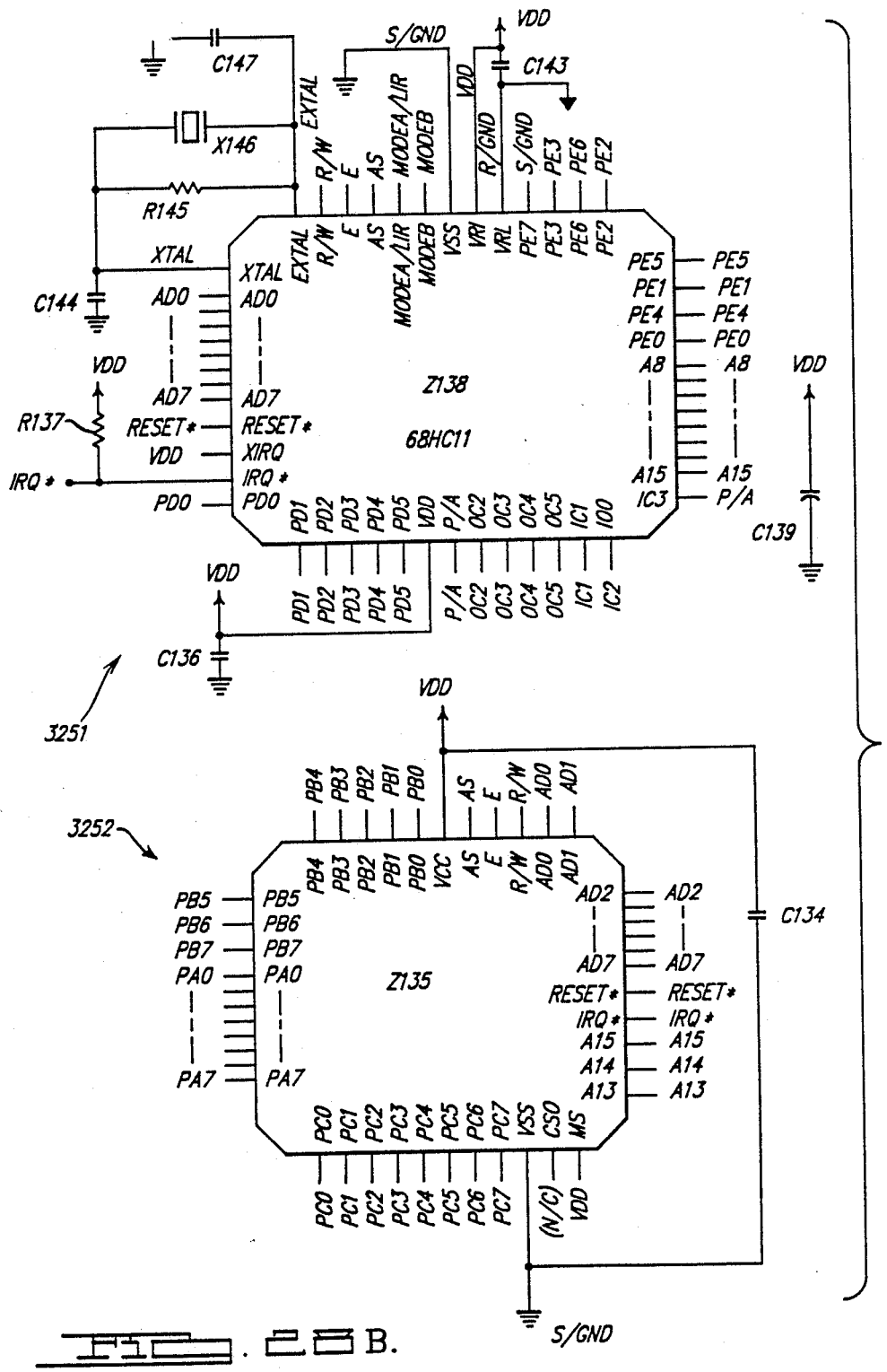
Figure 28C:
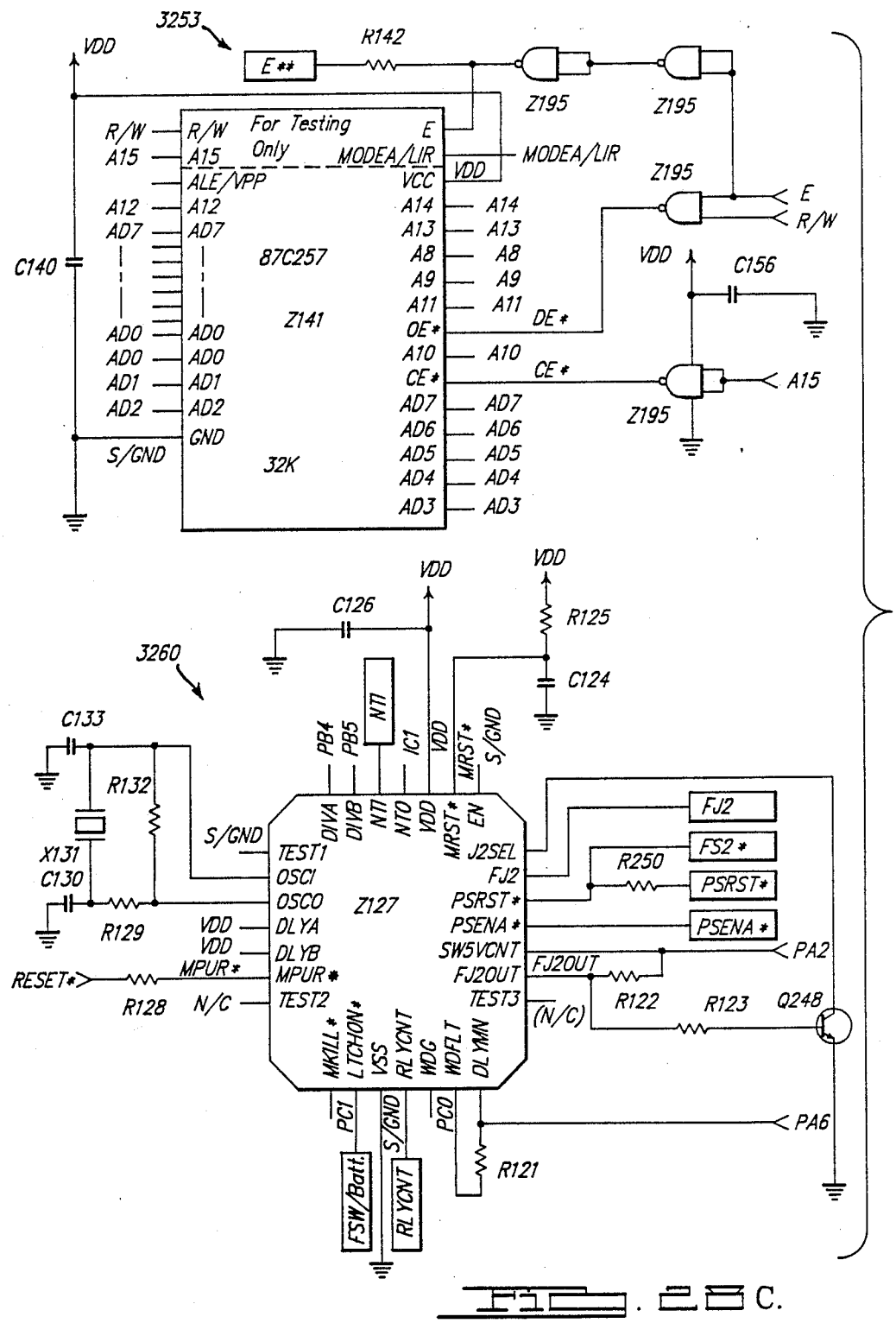

Referring generally to FIGS. 28A–28I, a schematic diagram of the transmission controller 3010 is shown. Each of the FIGS. 28A–28I generally correspond to one of the circuit blocks shown in FIG. 27B. Thus, for example, FIG. 28A illustrates the serial communication interface 3200 which provides a serial communication link between the transmission controller 3010 and the engine controller 3020. Similarly, FIG. 28B illustrates the MCU chip Z138 and the interface chip Z135 which form part of the micro core 3250. The remainder of the micro core 3250 is shown in FIG. 28C which illustrates the EPROM chip Z141 and its associated circuitry. It should also be noted that FIG. 28C illustrates a watchdog/reset chip Z127 and associated circuitry, which together correspond to the watchdog/reset circuit 3260. A discussion of the circuits contained in the watchdog/reset chip Z127 will be presented in connection with FIG. 30. Similarly, a discussion of the circuits contained in the interface chip Z135 will be presented in connection with FIG. 29.

Figure 28D:
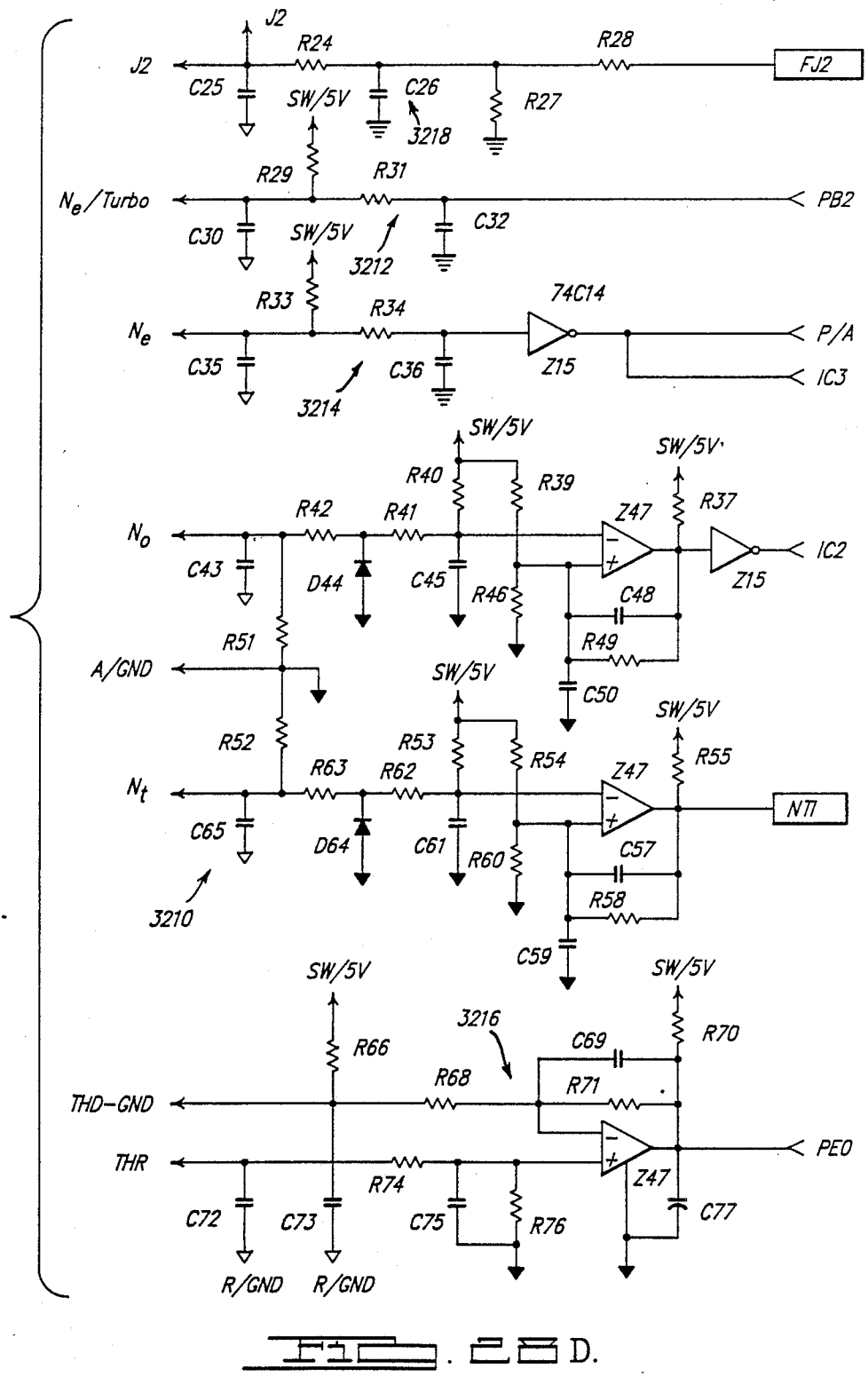
Figure 28E:
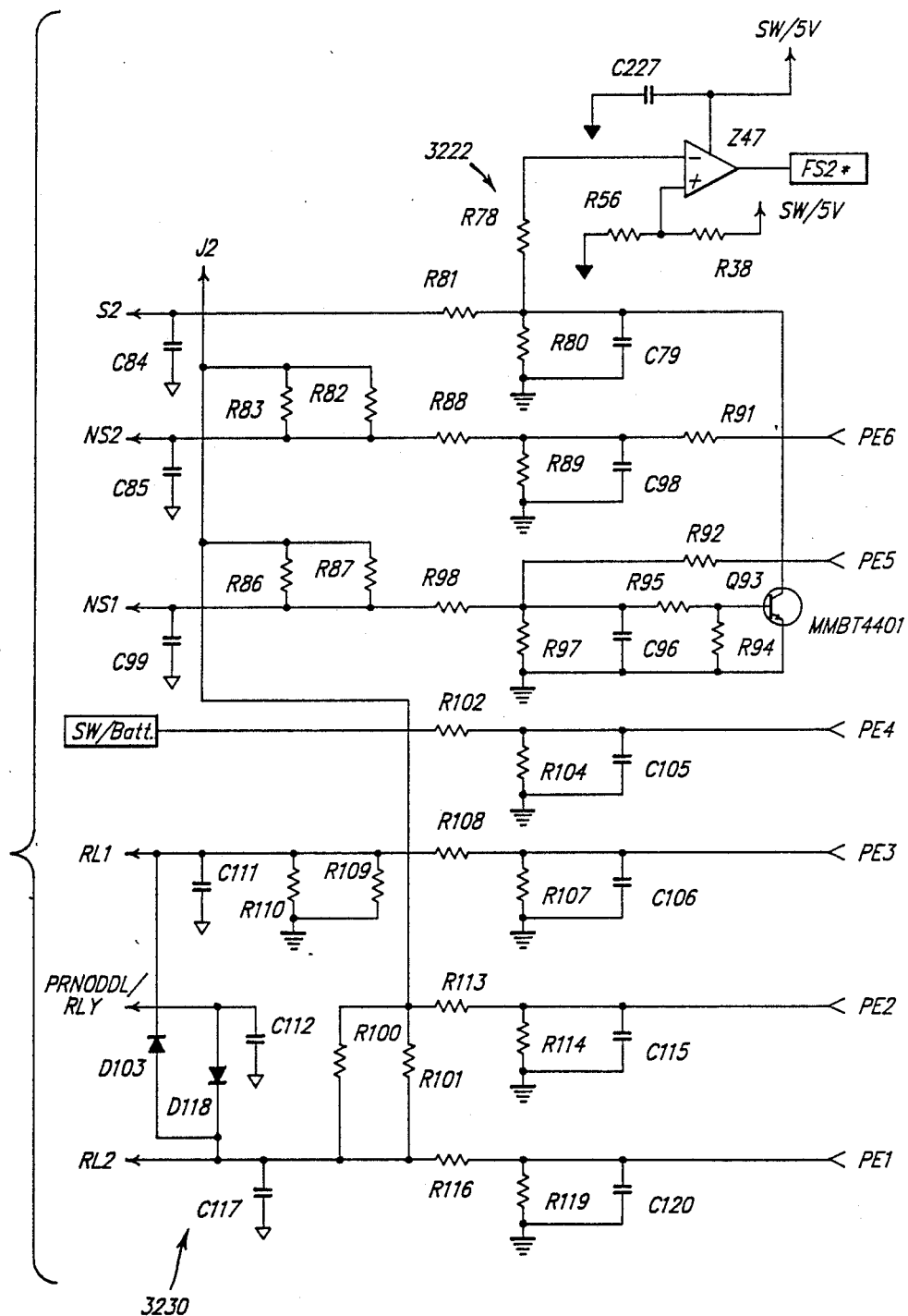
Figure 28F:
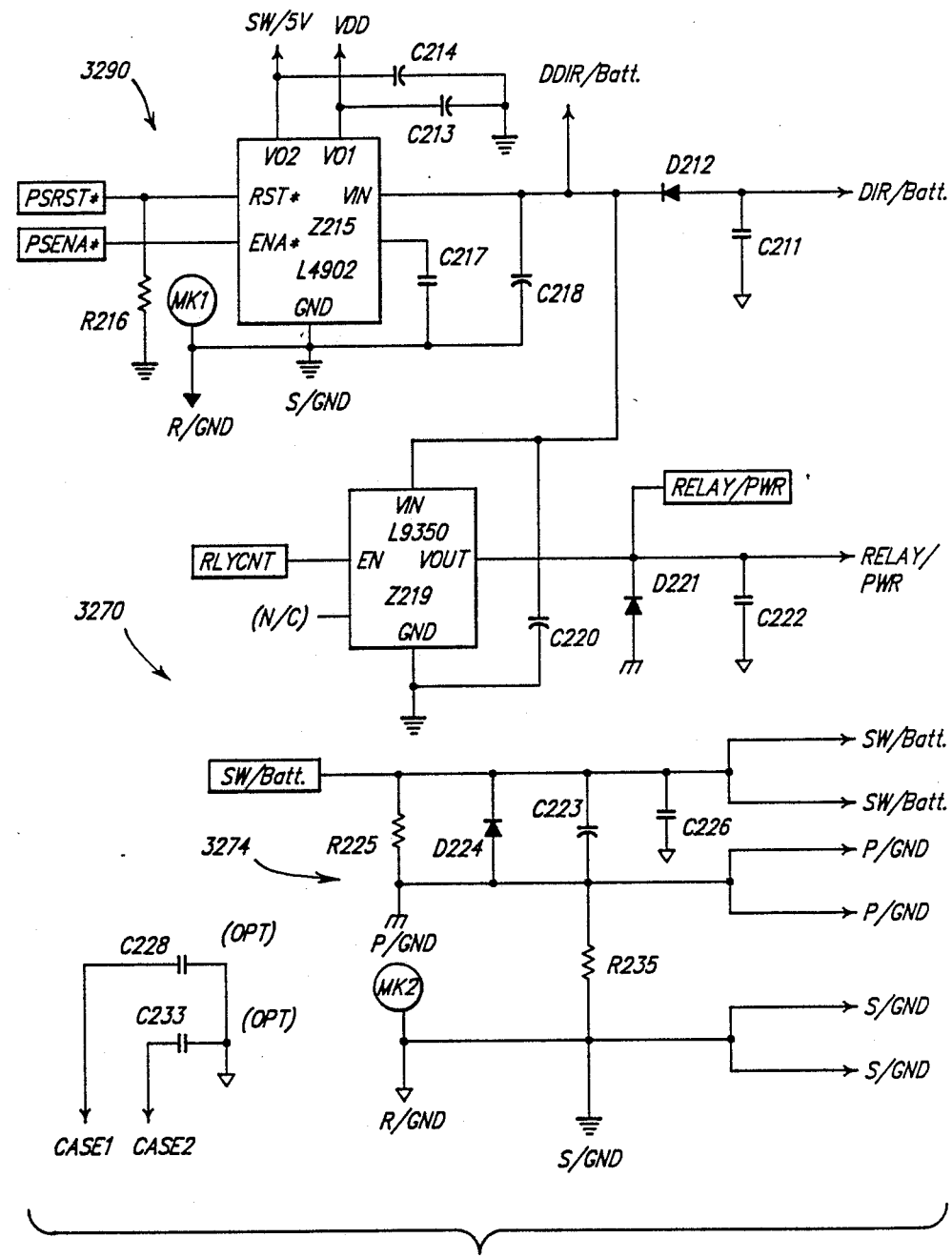
Figure 28G:
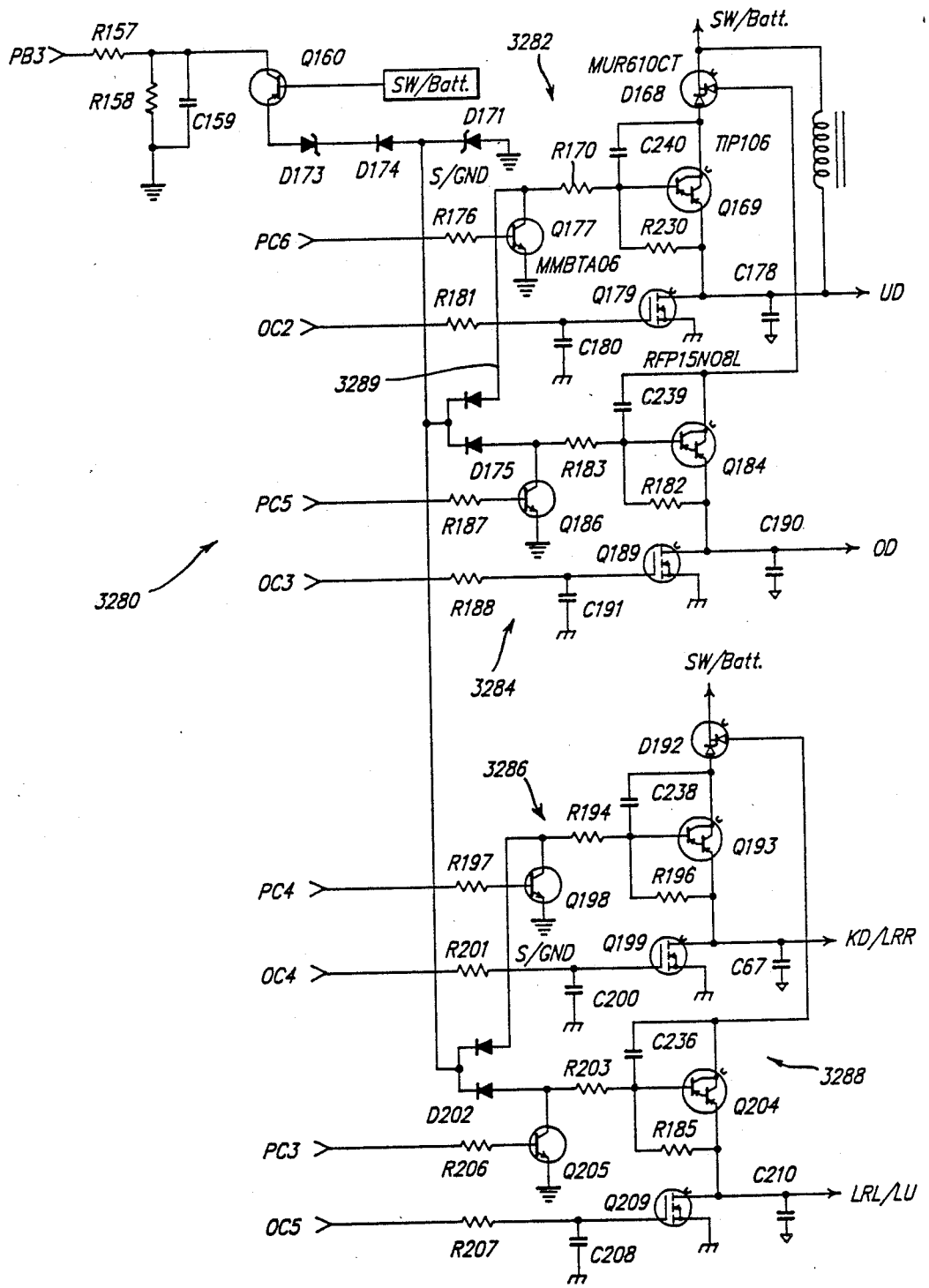
Figure 28H:
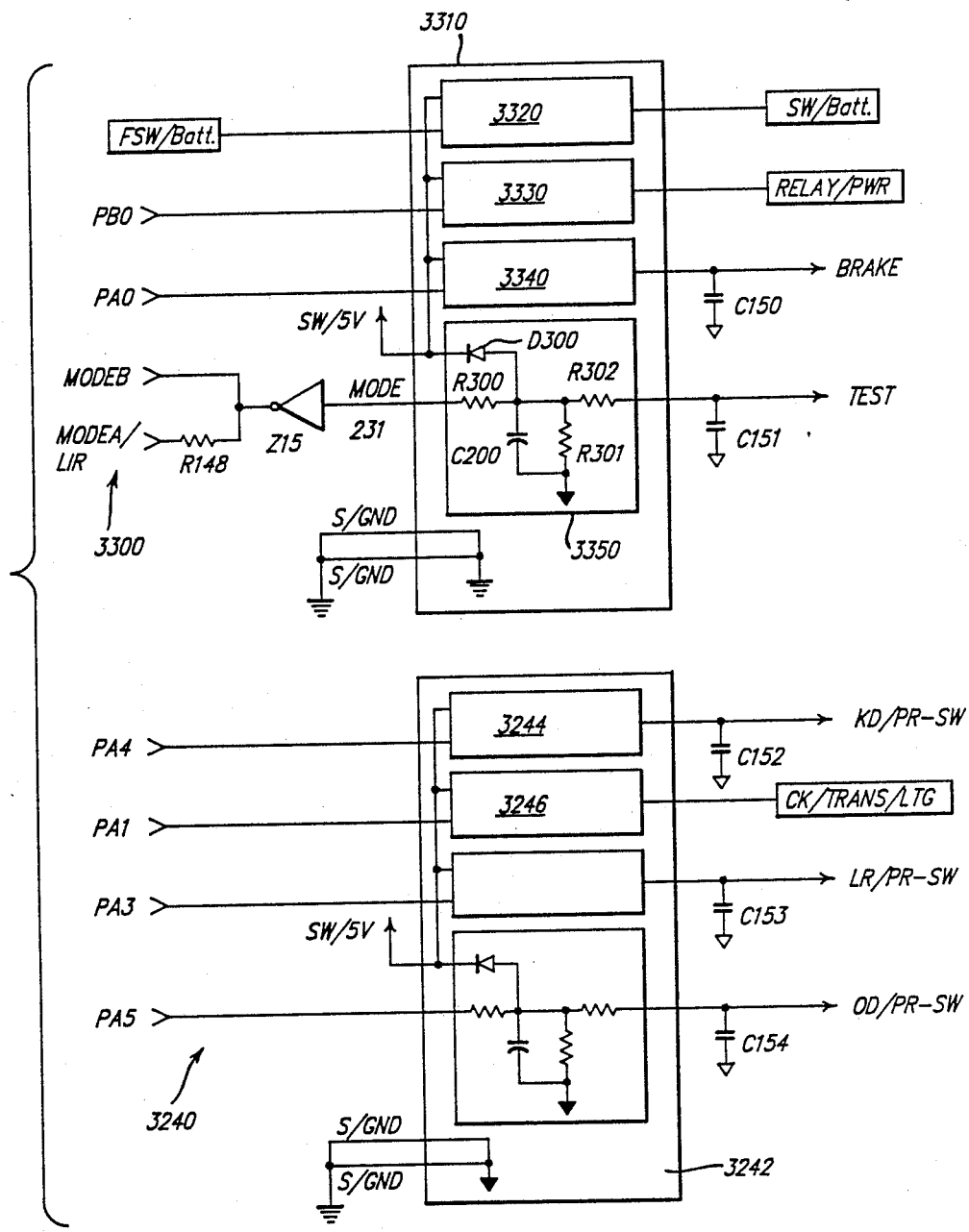
Figure 28I:
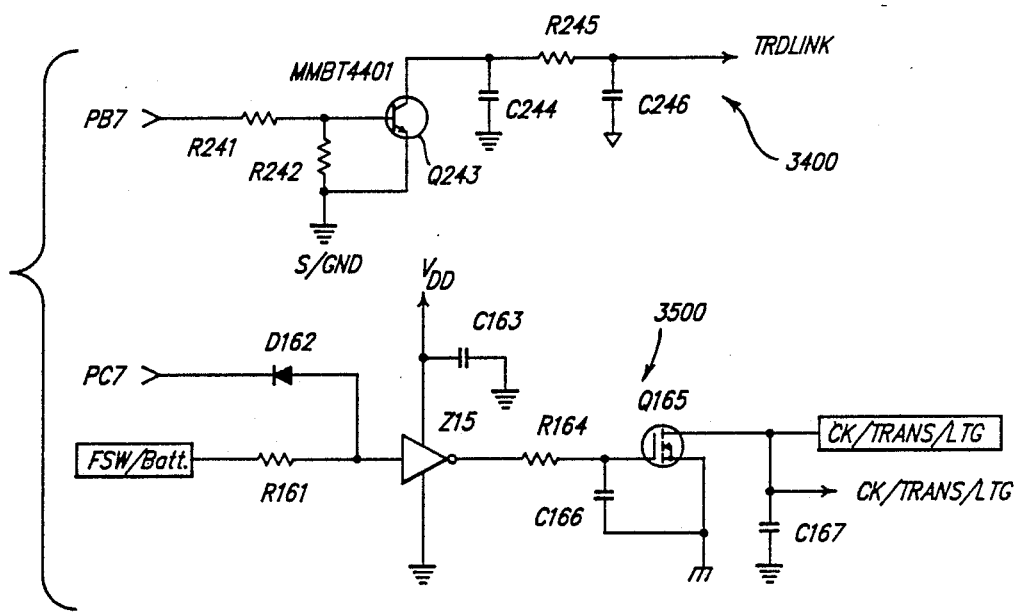

Continuing with an overview of the schematic diagram for the transmission controller 3010, FIG. 28D illustrates the speed and throttle input interface circuits 3210. FIG. 28E illustrates the PRNODDL interface circuits 3230 and part of the ignition switch interface circuits 3220. FIG. 28F illustrates the regulator circuit 3290 and the relay driver circuits 3270. FIG. 28G illustrates the solenoid driver circuits 2880. FIG. 28H illustrates the pressure switch interface circuits 3240. FIG. 28I illustrates an additional serial communication circuit 3400 and a diagnostic communication circuit 3500.

Referring specifically to FIG. 28A, a schematic diagram of the serial communications interface 3200 is shown. This communications interface actually provides for two serial communication channels for the transmission controller 3010. The first serial communication channel 3201 is based upon the Chrysler Collision Detection ($C^2D$) technology identified above. This technology is embodied in the communications chip Z14 which provides the intelligence to know when it has sent a message out onto a serial data bus and whether or not it has won access to the bus. Thus bus comprises the two conductors labeled "($C^2D$)+" and "($C^2D$)−". It should be noted from the above that this serial communications bus comprises a double ended or differential signal transmission link with the engine controller 3020 (or any other appropriate controller in the vehicle which is connected to the bus structure). The communications chip Z14 receives signals transmitted from the microcomputer chip Z138 (shown in FIG. 28B) via its connection to the "PD3" port of the microcomputer. Similarly, signals are transmitted from the communications chip Z14 to the microcomputer chip Z138 via the "PD2" port.

It should be noted that the communications chip Z14 is provided with a clock signal "E**" which is derived from the MCU chip's Z138 system clock, namely the "E" Clock. As shown in FIG. 28C, two NAND gates Z195 are connected in series to double buffer and double invert the E clock signal. Signal transmissions from the MCU chip Z138 are initiated by the MCU chip Z138 which pulls down a "Control" line of communications chip Z14 via a command signal transmitted from the "PD5" port. However, the communications chip Z14 will actually control the transfer of data from the MCU chip Z138 by providing a "SCLK" clock signal to the MCU's "PD4" port, which will clock the data in and out of the MCU chip.

It should also be noted that the communications chip Z14 is turned off when the transmission controller 3010 is in a stop mode, such as after the ignition key is turned off. The communications chip Z14 is turned off through the "SW/5 V" power supply. The SW/5 V voltage level is derived from a dual regulator Z215 contained in the regulator circuit 3290 shown in FIG. 28F. Specifically, the SW/5 V supply is switched on or enabled by the MCU Z138 in response to the ignition switch.

FIG. 28A also illustrates the second serial communications channel which is generally designated by the reference numeral 3202. The serial communications channel 3202 is generally comprised of a transmit line labeled "SCI-XMT" and a receive line labeled "SCI-REC". Each of these transmit and receive lines include an RC filter and a buffering inverter Z15. The transmit line SCI-XMT is connected to the "PD1" port of the microcomputer chip Z138, while the receive line SCI-REC is connected to the "PD0" port of the microcomputer chip. This second serial communications channel may be used for example to download appropriate test programs into the microcomputer chip Z138, such as for end of line testing at the manufacturing facility. In one form of the present invention, the SCI-REC receive line is used in conjunction with the test mode to transmit a signal to the microcomputer chip Z138 which will cause a ROM resident boot load program inside the microcomputer chip to control the receipt and initial execution of the test programs.

Referring to FIGS. 28B–28C, a schematic diagram of the micro core 3250 is shown. The micro core 3250 for the transmission controller 3010 generally comprises the microcomputer 3251 (chip Z138), the interface 3252 (chip Z135), and the memory 3253 (chip Z141). In the present embodiment, the microcomputer chip Z138 is a Motorola eight-bit microcomputer chip (Part No. 68HC11), which includes 256 bytes of RAM memory and 512 bytes of EPROM (erasable electrically programmable read only memory). However, it should be appreciated that other suitable microcomputer chips or microcomputer circuits could be employed in the appropriate application. Similarly, the memory 3253 (chip Z141) may be any suitable memory chip or circuit having sufficient capability to store the computer programs which operate in accordance with the control methodology discussed in detail above, such as an Intel 87C257 memory chip.

Figure 29:
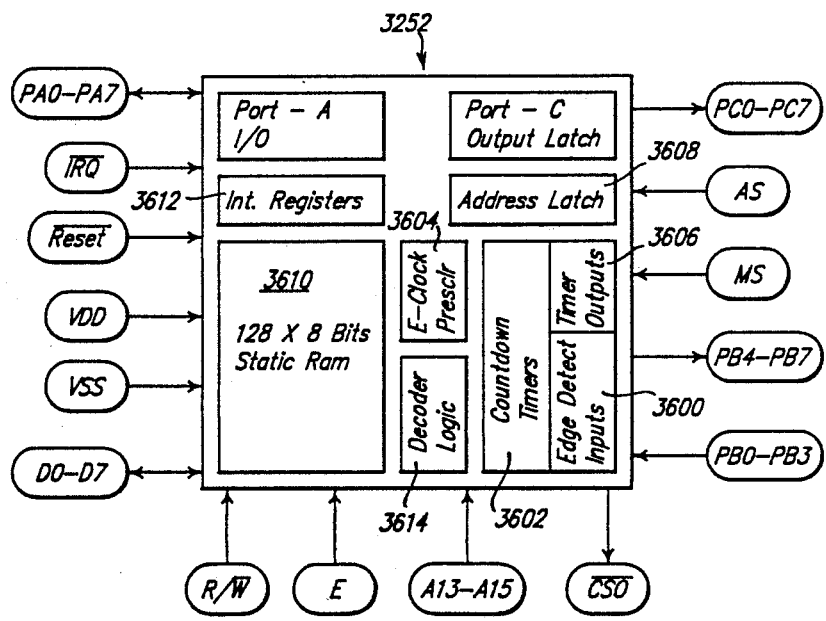
FIG. 29 is a block diagram of the interface chip shown in FIG. 28B.

As will be appreciated from FIG. 29, the interface 3252 (chip Z135) may be any suitable chip or set of chips/circuits which generally provide the circuits illustrated in this Figure. As will be discussed below, the interface 3252 (chip Z135) includes several internal registers for facilitating rapid communications between microcomputer 3251 (chip Z138) and several of the other circuits contained in the transmission controller 3010, such as the pressure switch interface circuit 3240. In the present embodiment, the various circuits illustrated in FIG. 29 have been combined into a single chip configuration, namely interface (chip Z135), to conserve space on the circuit board for the transmission controller 3010.

Each of the pins or ports of the various chips used in the micro core 3250 have been appropriately labeled, so that the various circuit connections between these chips and the other circuits contained in the transmission controller 3010 may be readily discerned from each of the FIGS. 28A–28I. For example, the "Control" and "Idle" lines of the communication chip Z14 in FIG.

28A are also shown to be labeled "PA7" and "PD1" respectively. As will be appreciated from FIG. 28B, both of these signal lines are connected to the interface (chip Z135), as this chip contains both the "PA7" and "PB1" labeled ports.

The microcomputer 3251 (chip Z138) and the interface 3252 (chip Z135) communicate with each other via an address/data bus labeled "AD0-AD7". The address/data lines in this bus are bidirectional to allow the transfer of both address and data information between the microcomputer 3251 (chip Z138) and the interface 3252 (chip Z135). As illustrated in FIG. 28C, the memory (chip Z141) is also connected to this address/data bus. The memory (chip Z141) is also connected to the microcomputer 3251 (chip Z138) via an address bus which is comprised of address lines "A8-A15". Three of these address lines, namely address lines A13-A15, are also connected to the interface 3252 (chip Z135) for selecting particular register or RAM locations within this chip.

Referring to a portion of FIG. 28D, a schematic diagram of the speed and throttle input circuits 3210 are shown. These circuits are designated at 3212, 3214 and 3218. The speed input signals are labeled "$N_e$/Turbo", "$N_e$", "$N_o$" and "$N_t$". The throttle input signals are labeled "THD-GND" and "THR".

The $N_e$/Turbo and $N_e$ signals are used in an application involving a turbo equipped engine, which provides a dual pick-up in the distributor of the engine. In this situation, both the NE and NE/Turbo signals are used to indicate engine speed. However, while these signals provide the same engine speed data, these signals are out of phase with each other. In this regard, it should be noted that in distributors having a single engine speed pick-up, only the $N_e$ signal would be used by the transmission controller 3010. FIG. 28D shows that the input interface circuit for the $N_e$/Turbo signal comprises a low pass filter 3212, which includes register R91 and capacitors C90 and C32. The filtered NE/Turbo signal is then directed to the "PB2" port of the interface 3252 (chip Z135). A similar filter network 3214 is also provided for the engine speed signal "$N_e$". However, an inverting amplifier Z15 is also included as a buffer to provide the fast rise and fall times required by the microcomputer 3251 (chip Z138), as well as noise immunity.

The "$N_o$" input signal represents the output speed of the transmission, while the "$N_t$" signal represents the input or turbine speed of the transmission. These signals are first filtered and then transmitted to a zero crossing detector circuit which includes the comparator Z47. Due to the sensitivity of these signals (e.g., minimum amplitude of 500 millivolts peak to peak), each of the comparators Z47 is provided with a positive feedback loop for adding hysteresis capability to these zero crossing detector circuits. For example, resistor R49 and capacitor C48 provide this hysteresis capability for the output speed signal $N_o$. It should also be noted that the filter circuits for these two speed signals use a ground signal labeled "A/GNB". This ground signal represents a clean ground signal which is derived from the microcomputer 3251 (chip Z138) to heighten the sensitivity of these filter circuits. Once the output speed signal $N_o$ is properly conditioned, it is transmitted to the "IC2" port of the microcomputer 3251 (chip Z138). In contrast, the conditioned input transmission speed signal $N_t$ is transmitted to the "NTI" port of the watchdog/reset chip Z127 (shown in FIG. 28C).

The THR and TH-GND signals are used to indicate the throttle position in the vehicle. These signals are processed through a unity gain differential amplifier circuit, which is generally designated by the reference numeral 3216. This differential amplifier circuit is used to sense the ground potential of the throttle position sensor, as well as sense the potentiometer wiper signal of this sensor. The output of the differential amplifier circuit 3216 is directed to the "PEO" port of the microcomputer 3251 (chip Z138). Since the throttle position signal is an analog input signal, it should be appreciated that the microcomputer 3251 (chip Z138) includes an internal analog to digital converter to permit further processing of this signal in accordance with the control methodology discussed above.

Figure 33:
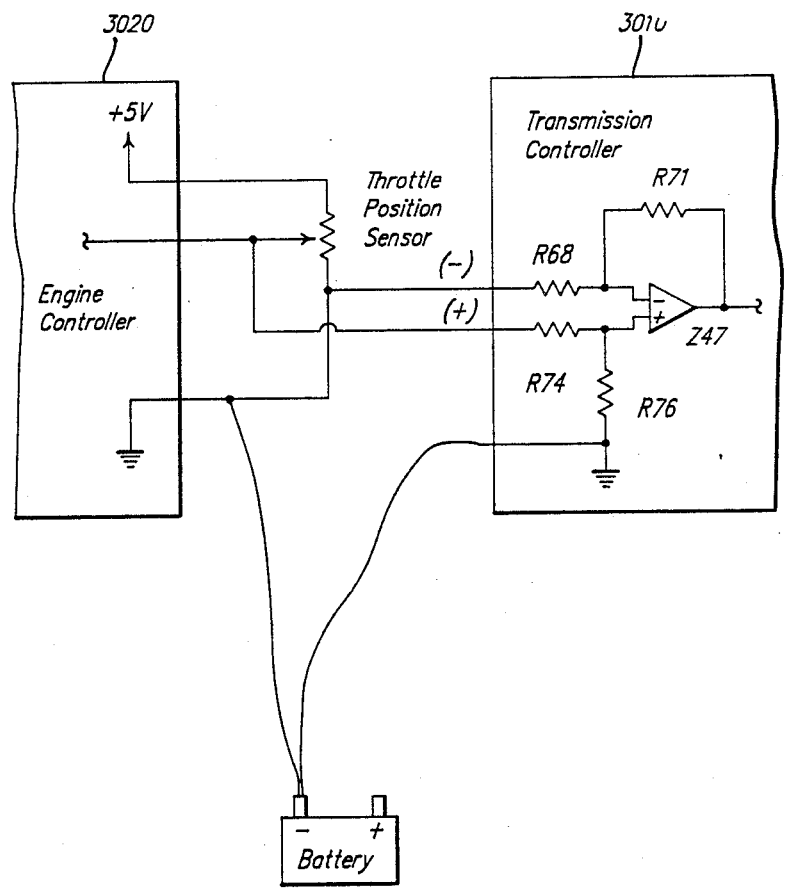
FIG. 33 is a diagrammatic drawing showing how the output of a throttle position sensor can be shared between two electronic controllers having dissimilar ground potentials.

This is further illustrated in conjunction with FIG. 33 where the dissimilar grounds of the engine controller 3020 and transmission controller 3010 are graphically depicted. Attention is invited also to circuit 3216 in FIG. 28D. Dissimilar grounds can generate a variable reference to ground. This is a function of variable resistance and inductance in the vehicle and its electrical system. The variable ground reference could be a significant percentage of the span of the output voltage from the throttle position sensor. Therefore, without the feature of the shared throttle position sensor circuit, two sensors would be needed.

FIG. 28D also shows a portion of the ignition switch interface circuits 3220. Specifically, FIG. 28D shows the interface circuit 3218 for the ignition switch signal "J2". The interface circuit 3218 provides a low pass filter whose output is directed to the "FJ2" port of the watchdog/reset chip Z127.

Turning to FIG. 28E, the last of the ignition switch interface circuits 3220 is shown. Specifically, an interface circuit 3222 for the crank only ignition signal "S2" is shown. The interface circuit 3222 includes a voltage divider (R78 and R80), a low pass filter (R61 and C79), and a comparator Z47. The voltage divider is used to decrease the voltage level of the S2 signal, so that it does not exceed the maximum input voltage of the comparator. The output of the comparator Z47 is connected to the "FS2*" port of the watchdog/reset chip Z127. The S2 ignition signal is used to hold the microcomputer 3251 (chip Z138) in a reset mode during the cranking of the engine. This provision is implemented for purposes of accuracy, since it is possible that the battery voltage in the vehicle could dip down during the cranking of the engine.

CIRCUIT FOR DETERMINING THE CRANK POSITION OF AN IGNITION SWITCH BY SENSING THE VOLTAGE ACROSS THE STARTER RELAY COIL AND HOLDING AN ELECTRONIC DEVICE IN A RESET CONDITION IN RESPONSE THERETO

FIG. 28E also illustrates the PRNODDL interface circuits 3230. Specifically, FIG. 28E shows the circuits used to interface the neutral start signals "NS1" and "NS2", as well as the circuits used to interface the reverse light signals "RL1" and "RL2". Each of these signals are digital signals which will generally be at a zero or battery voltage potential. Accordingly, each of the interface circuits for the signals include a pair of voltage dividing resistors (in addition to a filter) for getting the battery voltage level down to a 5 volt potential. In this regard, it should be noted that each of these input signals are coupled to the ignition switch signal "J2" through suitable pull-up resistors (e.g., R82 and R83) to ensure that these signals will provide battery voltage potential when their corresponding switches are open.

Figure 34:
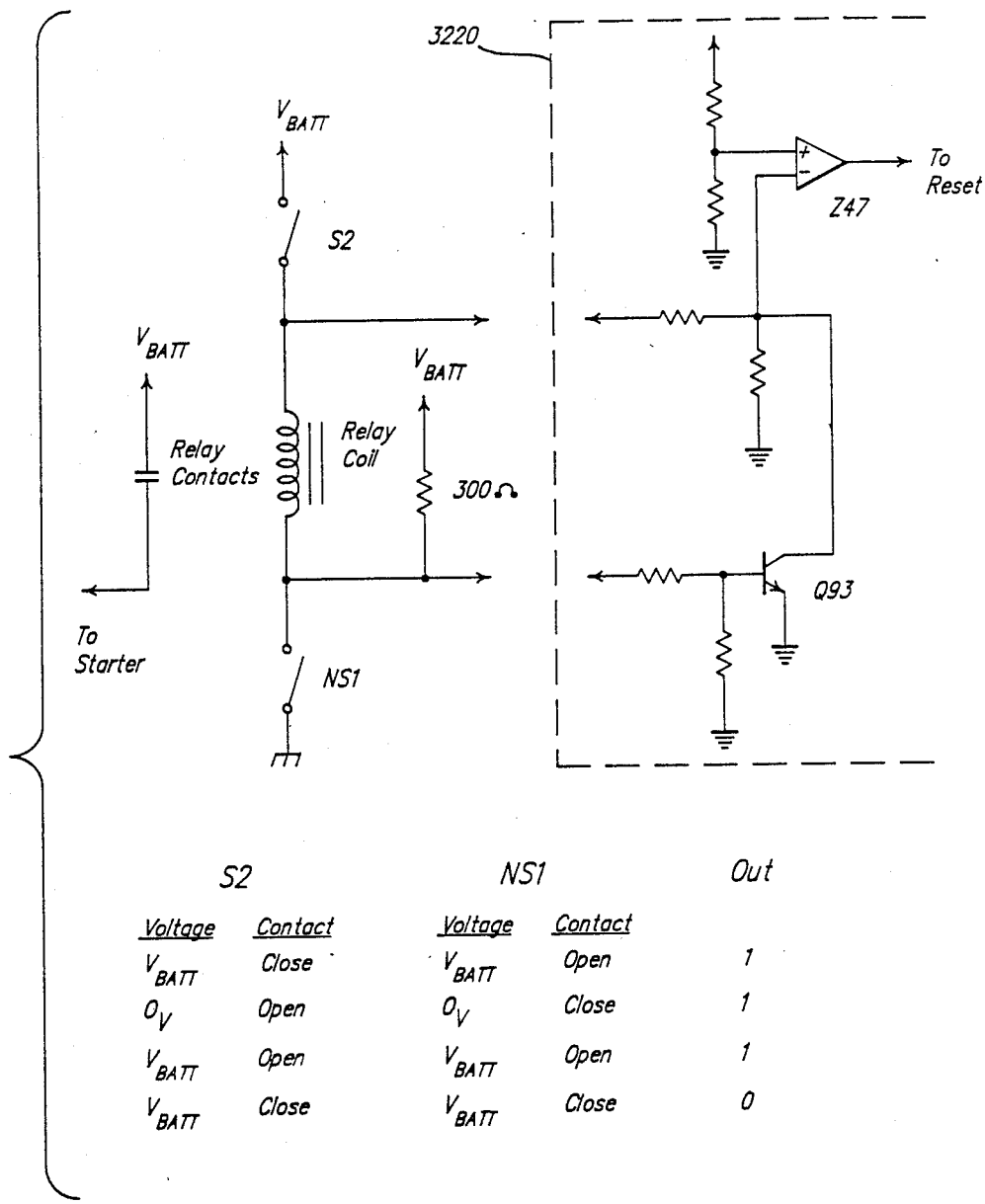
FIG. 34 is a diagrammatic illustration of a circuit for determining the crank position of an ignition switch by sensing the voltage across the starter relay coil and holding an electronic device in a reset condition in response thereto.

While the conditioned NS1 signal is transmitted to the "PE5" port of the microcomputer 3251 (chip Z138), this signal also provides a gating signal to the transistor Q93. The transistor Q93 is used to disable the S2 signal from causing a reset of the microcomputer 3251 (chip Z138). In other words, when the contact switch NS1 is open, the NS1 signal will be HIGH, thereby causing the transistor Q93 to conduct and pull down the input voltage to the comparator Z47. This provision is to ensure that the S2 signal does not cause a reset unless the transmission 100 is either in neutral or in park. This is also graphically depicted in FIG. 34 and its accompanying chart of the states of the contacts, devices and outputs.

Referring to FIG. 28F, a schematic diagram of the regulator circuit 3290 and the relay driver circuit 3270 is shown. Additionally, FIG. 28F shows two capacitors (C228-C233) which are used to tie the grounding potential of the circuit board for the transmission controller 3010 to the aluminum case which surrounds the circuit board. This optional feature may be used to provide additional RF or electromagnetic compatibility for the transmission controller circuitry.

DUAL REGULATOR

The regulator circuit 3290 shown in FIG. 28F generally comprises a dual 5 volt regulator chip Z215 which receives a voltage input signal from the vehicle battery and a command signal from the watchdog/reset chip Z127. This command signal, labeled "PSENA*", is used to enable or switch on and off the "VO2" output of the regulator chip under MCU command when ignition is off. The VO2 output of this chip provides the "SW/5 V" supply signal discussed above. This provision of a switchable 5 volt supply is particularly advantageous in a vehicle application, as it permits a substantial portion of the peripheral circuitry (or circuitry with a low priority) connected to the micro core 3250 to be shut down when the vehicle ignition is off thus reducing current draw on the battery. This can also be used under conditions requiring an orderly shutdown for purposes of storing last-sensed data etc. A continuous voltage output can be provided to high priority circuits such as a memory chip or a MCU. It can also be used to keep high priority circuits energized in a "KEY-OFF" situation, if desired, to allow for example the control of gear selection/display while the engine is off.

SHUTDOWN RELAY DRIVER

The shutdown relay driver circuit 3270 includes a self protecting, high side switch chip Z219 which is responsive to a "RLYCNT" control signal from the watchdog/reset chip Z127. Specifically, the relay control signal will cause the battery voltage to be transmitted to the "VOUT" port of the switch chip Z219. This voltage output from the chip Z219 is referred to as the "RELAY/PWR" signal, as it provides the power necessary to operate the shut down relay 3272 shown in FIG. 30. The shut down relay 3272 is used to cut power off to the solenoid driver circuits 3280 to thereby achieve a "LIMP-IN" mode previously described. Specifically, when the shut down relay 3272 is closed, the "SW/BATT" signal shown in FIG. 28F will be transmitted to the solenoid driver circuits 3280. However, before this SW/BATT signal is transmitted to the solenoid driver circuits 3280 it is processed through conditioning circuit 3274. The conditioning circuit 3274 includes a diode "D224" which is used to clamp the back EMF of the solenoid coils when the shut down relay 3272 is open. The conditioning circuit 3274 also includes a pull down resistor R225 to ensure that the line is pulled to ground despite the states of the solenoid driver circuitry. A capacitor C223 is also provided to suppress any line inductive energy spikes that might occur in response to the switching of the transmission solenoids.

THE USE OF DIODES IN AN INPUT CIRCUIT TO TAKE ADVANTAGE OF AN ACTIVE PULL-DOWN NETWORK PROVIDED IN A DUAL REGULATOR

Figure 31:
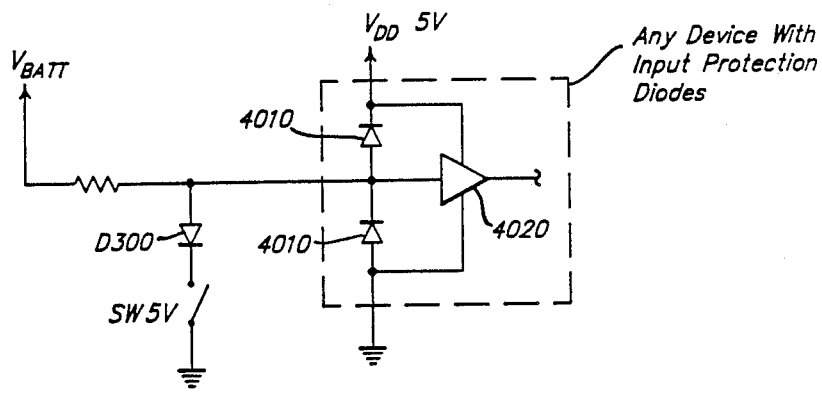
FIG. 31 is an equivalent circuit schematic diagram illustrating how diodes can be used in an input circuit to take advantage of an active pull-down network in a switched voltage section of a dual regulator to provide high voltage protection to a microcomputer with an electrostatic discharge protection circuit.

It should be noted that both the "RELAY/PWR" and "SW/BATT" signals provide input signals to the conditioning circuit block 3310. In the present embodiment, the conditioning circuit block 3310 employs thick film packaging technology to effective create a single compact chip for the circuits contained in this block. The conditioning circuit block 3310 is comprised of four identical conditioning circuits 3320-3350. Each of these conditioning circuits include an RC filter (R300 and C200) and a pair of voltage dividing resistors (R301 and R302). Since the SW/BATT and RELAY/PWR signals are at the battery voltage potential, the voltage dividing resistors cut this voltage level down to the 5 volt logic level used in the micro core 3250. This is also further illustrated in FIG. 31 which shows this concept in a simpler form.

It is also important to note that each of the conditioning circuits 3320-3350 include a diode "D300" which connects the input signal of each of these circuits to the SW/5 V supply line. This is a particularly advantageous feature of the present invention, because the regulator chip Z215 will actively pull the SW/5 V signal level down to ground during an over voltage condition (e.g., where the battery voltage exceeds 30 volts). Accordingly, the diode D300 will clamp the battery voltage level input signals to the conditioning circuits 3320-3350 down to ground during such an over voltage condition. This will prevent excessive input signals from being transmitted to the micro core circuits 3250 via ESD protection diodes. In this regard, for example, the RELAY/PWR signal is transmitted to the "PB0" port of the interface circuit Z135 of the micro core 3250 through the conditioning circuit 3330. This feedback provision will enable the microcomputer 3251 (chip Z138) to confirm the status of the relay driver circuit 3270 and is also used while testing the watchdog reset.

OPEN LOOP CONTROL OF AND SPIKE MONITOR FOR SOLENOID COIL DRIVERS

Referring to FIG. 28G, a schematic diagram of the solenoid driver circuits 3280 is shown. The solenoid driver circuits 3280 comprise an individual driver circuit for each of the four solenoid-actuated valves 630, 632, 634 and 636 contained in the transmission namely, driver circuits 3282-3288. Each of these driver circuits is provided with two input signals, one of which is derived from the interface 3252 (chip Z135) and the other of which is derived from the microcomputer 3251 (chip Z138). For example, in the driver circuit 3282, an enablement command signal is transmitted from "PC6" port of the interface 3252 (chip Z135), and a current control signal is transmitted from the "OC2" port of the microcomputer 3251 (chip Z138). The OC2 signal is derived from an internal timer of the microcomputer 3251 (chip Z138). Specifically, the OC2 control signal generated by MCU timer functions provides a series of pulses which have an appropriate duty cycle for causing a pulse width modulation of the current to the solenoid coil, such as the underdrive (UD) coil, in addition a "pull in" pulse is MCU timer generated when the solenoid coil is first turned on.

When the microcomputer 3251 (chip Z138) causes the interface 3252 (chip Z135) to latch its "PC6" port into a HIGH state, the driver circuit 3282 will be enabled through the gating on of transistors Q177 and Q169. The gating on or HIGH pulse of the OC2 signal will permit the current in the UD solenoid coil to charge up through the transistor Q179. Then, when the pulse of the OC2 signal is turned off, current through the UD solenoid coil will circulate in the path created by the diode D168 and transistor Q169. The result will be an efficient slow decay of the current through the UD solenoid coil. At this point, it should be noted that the junction between the Darlington pair transistor Q169 and the MOSFET resistor Q179 will be at a potential above the potential of the SW/BATT supply signal.

Subsequently, when the microcomputer chip Z138 causes the "PC6" port of the interface 3252 (chip Z135) to switch to a LOW state, the transistor Q177 will switch off and cause a rapid decay of current through the UD solenoid coil. When the gate signal is removed from the transistor Q177, it should be noted that the Darlington pair transistor Q169 will also turn off. This rapid decay of current will also cause the voltage on the conductor 3289 to rise above the SW/BATT potential. At some point (e.g., 25 volts), this rising potential will cause the Darlington pair transistor Q169 to turn on again to limit the spike of this rising voltage potential. However, it is important to note that the voltage potential on conductor 3289 is transmitted through the diode "D174" to the zener diode "D173". At a predetermined potential (e.g., 24 volts), the zener diode D173 will breakdown and cause current to flow through the transistor Q168 to the "PB3" port of the interface 3252 (chip Z135).

This spike monitor circuitry is an important aspect of the present invention, as it allows the microcomputer 3251 (chip Z135) to determine whether the solenoid coil is in a shorted or open condition. In other words, the spike monitor circuitry of the solenoid driver circuits 3280 will tell the microcomputer 3251 (chip Z138) that the solenoid coil has indeed turned off. In this regard, it should be noted that the SW/BATT signal continually keeps the transistor Q168 in a conducting condition, so that the current form conductor 3289 will pass directly through its emitter and collector junctions for transmission to the "PB3" port of the interface 3252 (chip Z135).

It should be appreciated that the diode "D173" is connected to each of the driver circuits 3282–3288 through appropriate diodes (e.g., D175 and D202), so that the microcomputer 3251 (chip Z138) will be able to detect the presence of a voltage spike from each of these driver circuits. While each of the driver circuits 3282 are substantially identical, the connections employed in the driver circuit 3282 will be briefly described.

The OC2 port of the microcomputer 3251 (chip Z138) is connected to the gate of the MOSFET transistor Q179 through the resistor R161. The source of the transistor Q179 is connected to ground, while the drain of this transistor is connected to one end of the UD solenoid coil. The other end of the UD solenoid coil is connected to the junction between the SW/BATT potential and the diode pair D168. The common emitter junction of the Darlington pair transistor Q169 is connected across the reverse bias diode in the diode pair D168, while the collector junction of the transistor is connected to the drain of the MOSFET transistor Q179. A capacitor C248 is coupled across the collector and base junctions of the Darlington pair transistor Q169 for stability, while a resistor R298 is connected across the base and emitter junction of this transistor to provide sufficient current for spike monitor operation. The base of the transistor Q169 is also connected to the collector junction of the transistor Q177 through the resistor R178. The base of the transistor Q177 is coupled to the "PC6" port of the interface circuit Z135 through the transistor R176. The emitter junction of the transistor Q177 is connected to ground. The conductor 3289 is connected to the collector junction of the transistor Q177, and is coupled to the diode D174 through one of the diodes labeled "D175".

Figure 35:
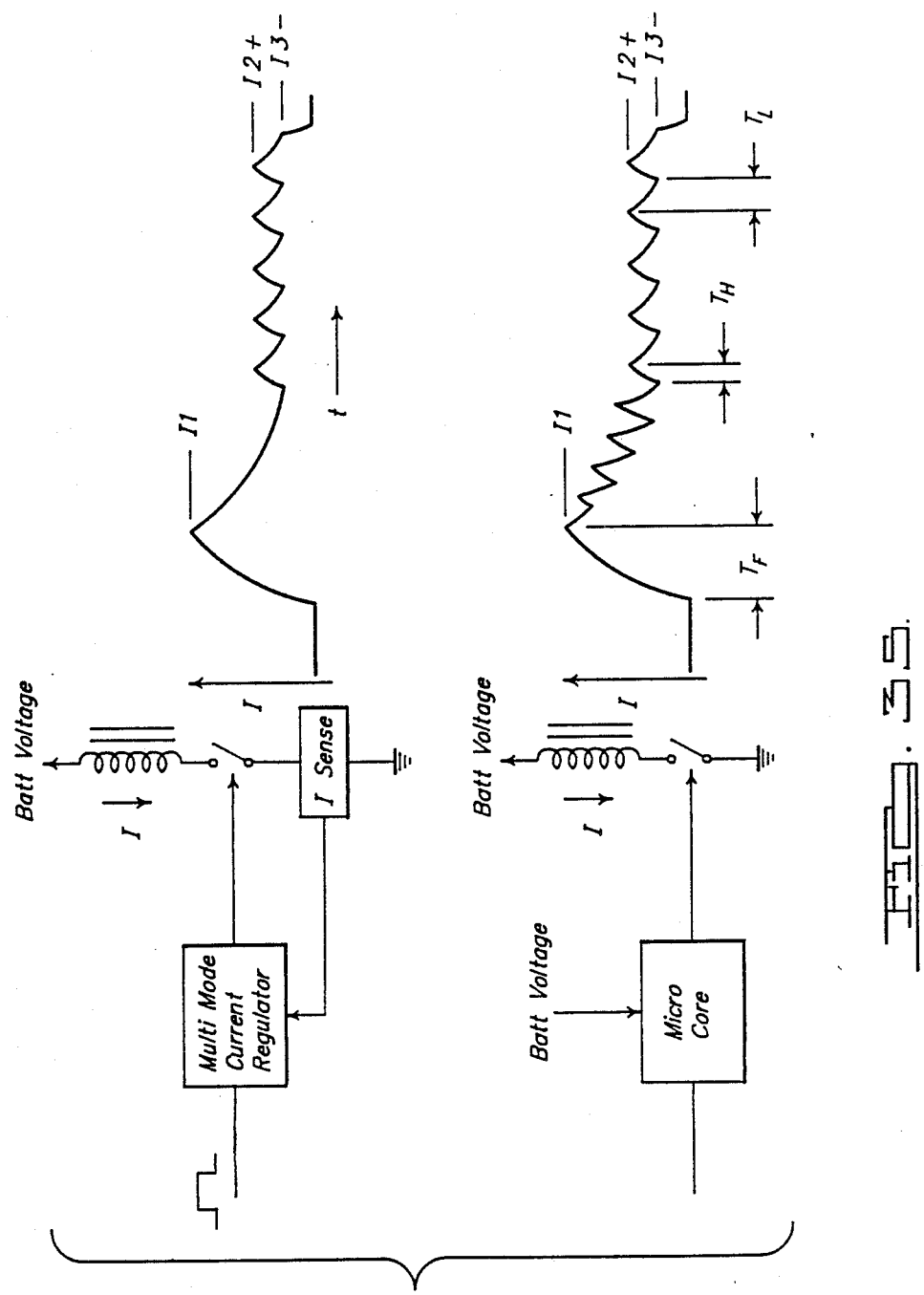
FIG. 35 is an illustration of closed loop and open loop control of solenoid coil drivers showing basic differences between the circuits and basic similarities between the voltage outputs.

FIG. 35 is an illustration of closed loop and open loop control of solenoid coil drivers showing basic differences between the circuits and basic similarities between the voltage outputs. An electronic driver circuit for the open loop control of the energization of a solenoid coil, forming part of an electromagnetic solenoid actuator valve, in response to a control pulse produced by a control circuit and where the predetermined schedules are a function of the inductance and resistance of the coil, the desired peak output voltage from the coil and the desired average holding current through the coil.

The principals of the injector driver circuit are also described in co-assigned U.S. Pat. No. 4,631,628, issued on Dec. 23, 1986, which is expressly hereby incorporated by reference.

Referring to FIG. 28H, a schematic diagram of the pressure switch interface circuits 3240 is shown. The pressure switch interface circuits 3240 are generally embodied in a conditioning circuit block 3242 which is identical to the conditioning circuit block 3310 in the present embodiment. Thus for example, the conditioning circuit block 3242 includes a conditioning circuit 3244 for the "KDPR-SW" pressure switch signal. It should also be noted that the conditioning circuit block 3242 includes a conditioning circuit 3246 which has an input signal labelled "CK/TRANS/LTG". This input signal is generated in the diagnostic alert circuit 3500 shown in FIG. 28I.

Referring to FIG. 28I, the diagnostic alert circuit 3500 is shown to be provided with an input signal labeled "FSW/BATT", which represents the filtered battery voltage level produced at the output of the conditioning circuit 3320 shown in FIG. 28H. As discussed previously, the SW/BATT signal indicates that the battery voltage is being supplied to the solenoid drive circuits 3280. The conditioning circuit 3320 is used to drop this voltage level down to a usable 5 volt logic level which is fed back to the "PC7" port of the interface 3252 (chip Z135) through the diode "D162" of the diagnostic alert circuit 3500.

The FSW/BATT signal is transmitted through an inverting amplifier Z15 which is used to gate the MOSFET transistor Q165. The transistor Q165 produces the CK/TRANS/LTG signal which may be used to alert the operator that power has been cutoff from the transmission solenoid-actuated valves 630, 632, 634 and 636, such as through a light on a diagnostic panel in the passenger compartment. In an application involving the use of the diagnostic alert circuit 3500, the conditioning circuit 3246 shown in FIG. 28H will provide a feedback signal to the "PA1" port of the interface 3252 (chip Z135) to confirm that the diagnostic panel has been provided with the appropriate signal.

FIG. 28I also shows an additional communication circuit 3400 which provides a direct serial transmission link from the transmission controller 3010 to the engine controller 3020. Such a separate transmission channel may be employed when it is desired to send high priority or rapid signals to the engine controller 3020. For example, in some applications it may desirable for the transmission controller 3010 to advise the engine controller 3020 that a gearshift is about to take place. In such a situation, the microcomputer 3251 (chip Z138) would cause an appropriate signal to be placed on the "PB7" port of the interface 3252 (chip Z135) to gate on the transistor C243. The gating on of the transistor Q243 will generate the "TRDLTNK" signal through the filter network comprised of resistor 245 and capacitors 244 and 246.

Referring again to FIG. 28H, the test mode circuit 3300 is shown to include the conditioning circuit 3350. When a testing mode for the transmission controller 3010 is desired, the "test" input signal will be HIGH, thereby causing a LOW "modea/lir" signal to be transmitted to the microcomputer chip Z138. This signal will cause the microcomputer chip Z138 to initiate the test mode sequence discussed above.

Referring to FIG. 29, a block diagram of the interface chip Z135 is shown. The pin designations shown in this figure (e.g., "PC0-PC7") generally correspond to the pin designations shown for the interface 3252 (chip Z135) in FIG. 28B. There is one exception to this correspondence. In FIG. 28B, the pins for Port-A are designated "AD0-AD7"; whereas in FIG. 29, these pins are designated "D0-D7".

In addition to Port-A, the interface chip Z135 also includes two other ports, namely Port-B (i.e. pins PB0-PB7) and Port-C (i.e. pins PC0-PC7). Pins PB0-PB3 of Port-B are connected to the edge detect input circuits 3600. The edge detect circuits 3600 provide a way to capture the occurrence of an event, such as the turning off of a coil of a solenoid-actuated valve, at a time when the microcomputer 3252 (chip Z138) might otherwise be occupied. Thus, for example, pin PB3 of the interface 3252 (chip Z135) is connected to the spike monitor circuitry of the solenoid driver circuits 3280 in order to transmit a signal indicative of the turning off of a coil of a solenoid-actuated valve to the microcomputer 3251 (chip Z138) through interface 3252 (chip Z135). When such a signal is received, the interface 3252 (chip Z135) can generate an interrupt signal IRQ* which will inform the microcomputer 3251 (chip Z138) that event information has been received for further processing.

The interface 3252 (chip Z138) also includes a plurality of countdown times 3602, which are responsive to the "E" clock signal of the microcomputer, through the E-clock prescaler circuit 3604. The output from these timers may be transmitted to pins PB4-PB7 through the timer output circuit 3606, in the event that the timer features of the interface chip are desired to be employed. Otherwise, the pins PB4-PR7 may be used as general purpose output pins.

While Port-C of the interface 3252 (chip Z135) could be used as a low order address port, the mode select signal "MS" is used in the preferred embodiment to configure this port as an output port. In this configuration, the address strobe signal "AS" from the microcomputer chip Z138 is used to command the address latch 3608 to capture low under address information at AD0-AD7 of the interface 3252 (chip Z135), The interface 3252 (chip Z135) also includes a random access memory circuit 3610, a plurality of internal registers 3612 and a decoder logic circuit 3614. Particular locations in the RAM 3610 and particular internal registers 3612 may be accessed through the decoder logic circuit 3614, which is responsive to the address signal pins "A13-A15" in addition to the latched low order address $A_0$-$A_7$. The internal register 3612 are used to provide access and control of the various ports and counters for the interface 3252 (chip Z135).

Figure 30:
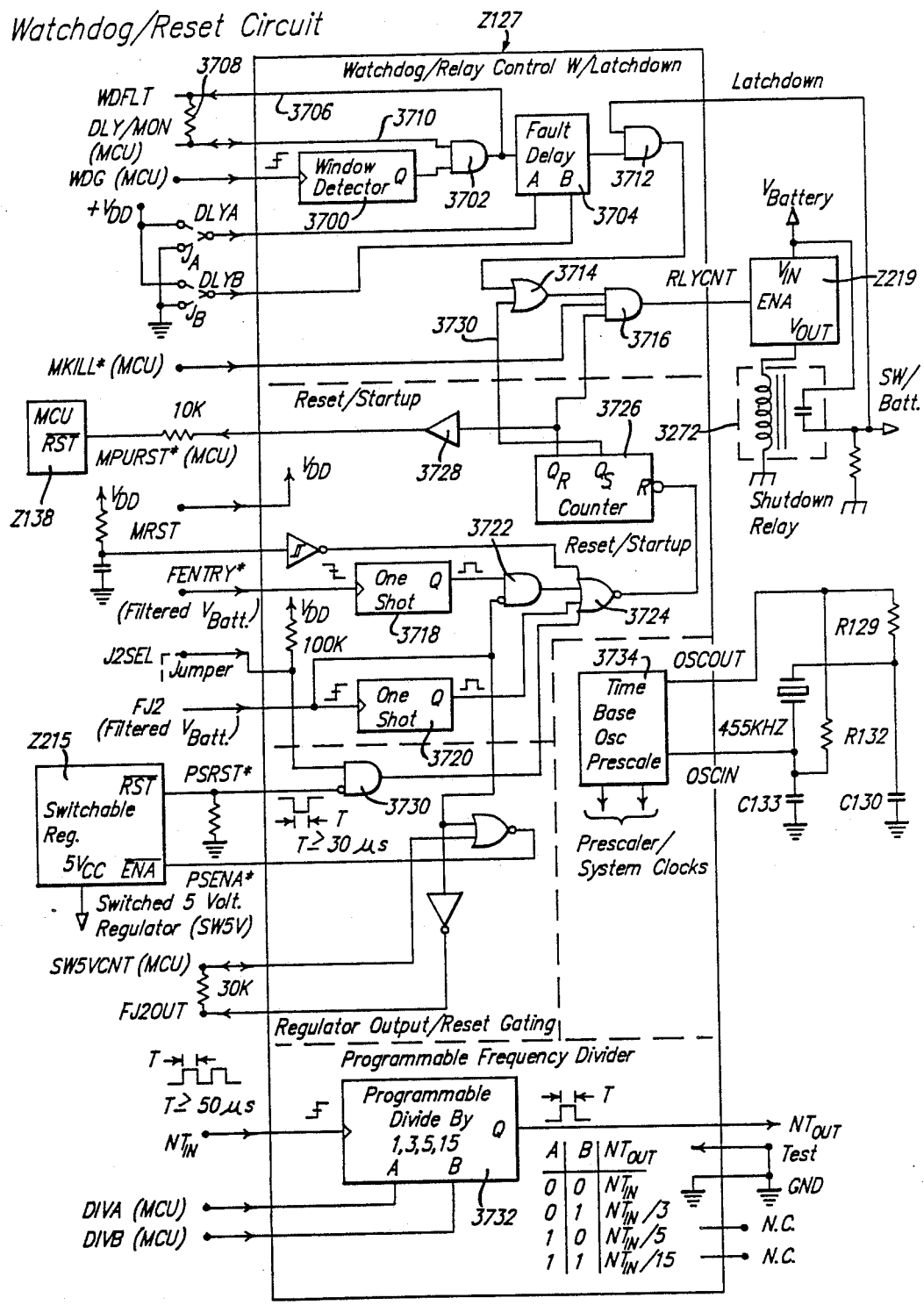
FIG. 30 is a block/schematic diagram of the watchdog/reset chip shown in FIG. 28C.

Referring to FIG. 30, a block/schematic diagram of the watchdog/reset circuit Z127 is shown in association with some of the circuits corrected to the watchdog/reset circuit Z127. The first function of the watchdog/reset or "WD" circuit is to monitor the operation of the microcomputer 3251 (chip Z138) by requiring the MCU to periodically transmit a signal to the WD circuit. This signal is designated "WDG" in both FIGS. 28C and 30. If the WD circuit does not receive the WDG signal within a predetermined time window, then the WD circuit will know that the MCU may not be functioning as desired. However, before the WD circuit will react to this situation, it will wait a predetermined amount of delay time to see if proper functioning of the MCU will be quickly restored. If the WDG signal is not received by the end of the delay period, then the WD circuit will transmit a "RLYCNT" signal to the relay driver circuit Z219 which will cause the shutdown relay 3272 to remove electrical power from the solenoid driver circuit 3280.

In this regard, FIG. 30 shows that the WD circuit includes a window detector circuit 3700 which receives the WDG signal. The window detector circuit 3700 includes an up counter which is reset by the WDG signal, and a pair of comparators which determine whether or not the WDG has been received within the predetermined time window (e.g., 14 ms.). If the WDG signal is received too early or too late, or not received at all, then the Q output of the window detector will switch to a LOW digital state. This will in turn drive the output of AND gate 3702 LOW.

The output of the AND gate 3702 is connected to a fault delay circuit 3704 and to a conductor 3706. The fault delay circuit 3704 will give the MCU a predetermined time period (e.g. 64–512 ms.) to transmit the WD signal. This time period may be altered between four different values depending upon the particular voltage or ground connections for the input signals "DLYA" and "DLYB". In the meantime, the conductor 3706 will transmit the "WDFLT" feedback signal, and provide a way of separately testing the operation of the window detector 3700 and the fault delay circuit 3704 within the WD circuit. The conductor 3706 is connected to an input of the AND gate 3702 through the resistor 3708 and conductor 3710. To test the fault delay circuit 3704, the MCU will transmit the "DLY/MON" signal, which will drive the AND gate 3704 LOW in order to simulate the absence of the WD signal from the window detector circuit 3700.

If the WD signal is not received within the time period controlled by the fault delay circuit 3704, then the AND gate 3712 will switch states, and cause the relay driver circuit Z219 to cut off power through the logic connections provided by OR gate 3714 and AND gate 3716. The AND gate 3712 also receives a "Latchdown" signal from the relay driver circuit, which will prevent the AND gate 3712 from switching states again until the reset start-up sequence is initiated, even if the MCU transmits a proper WDG signal in the intervening time period. In other words, once the WD circuit Z127 causes the relay driver circuit Z219 to remove electrical power from the solenoid driver circuit 3280, the reset start-up sequence must be initiated before power will be restored to the solenoid driver circuit.

The WD circuit is also responsive to a master kill signal "MK" from the MCU for removing power from the solenoid driver circuit 3280. In other words, when the MCU determines that power should be removed for whatever reason, then the MK signal will be transmitted to the relay driver circuit through the AND gate 3716.

Another function of the WD circuit Z127 is to control the reset start-up sequence which will occur, for example, when electrical power is first applied to the transmission controller 3010. When power is first applied, this sequence will be initiated by the master reset signal "MRST", which is derived from an RC delay off the VDD power supply.

The reset start-up sequence may also be initiated from a filtered door entry signal "FENTRY". This optional feature could be provided when it is desired, for example, to have the vehicle electrically display the current PRNODDL transmission mode in response to the opening of the vehicle door, prior to the time that the key is inserted into the vehicle ignition. The reset start-up sequence may also be initiated from an actuation of the ignition key, via the ignition signal "FJ2".

The WD circuit includes a pair of one shot multivibrators 3718–3720, which will generate a single or one shot pulse output whenever the FENTRY or FJ2 signals are received. The output from one shot 3718 is combined with the FJ2 signal at the AND gate 3722, while the output of the one shot 3720 is fed directly to the NOR gate 3724. The output from the NOR gate 3724 is connected to the reset input to the counter 3726. Accordingly, it should be appreciated that the NOR gate 3724 serves to combine all those inputs which can cause a reset condition to be generated.

The counter 3726 will generate the reset signal "MPURST", which will be transmitted to the MCU through the buffer 3728. The counter 3726 will also generate a false OK signal on conductor 3730, which is necessary to override or reverse the Latchdown signal. Thus, in the situation where the Latchdown signal has been generated, the momentary false OK signal will allow re-enablement of the relay driver circuit Z219 through OR gate 3714 and AND gate 3716. This re-enablement will, in turn, override the state of the Latchdown signal, and permit electrical power to the solenoid driver circuit 3280 to be applied.

While the above described reset start-up sequence will cause only a momentary MPURST signal to be transmitted to the MCU, the WD circuit also includes a provision for maintaining the presence of this reset signal in response to predetermined regulator conditions. In this regard, it should be appreciated that the continued presence of the reset signal will disable the operation of the MCU, until proper operation of the regulator is restored and the reset signal is removed (i.e. the digital state of this signal is changed).

THE UTILIZATION OF A RESET OUTPUT OF A VOLTAGE REGULATOR AS A SYSTEM LOW-VOLTAGE INHIBIT

As shown in FIG. 30, the regulator circuit Z215 will generate a power supply reset signal "PSRST", which will be transmitted to the NOR gate 3724 through the AND gate 3730. This power supply reset signal will be generated whenever the input voltage to the regulator is too low or too high, or when the regulator is being overloaded.

Figure 32:
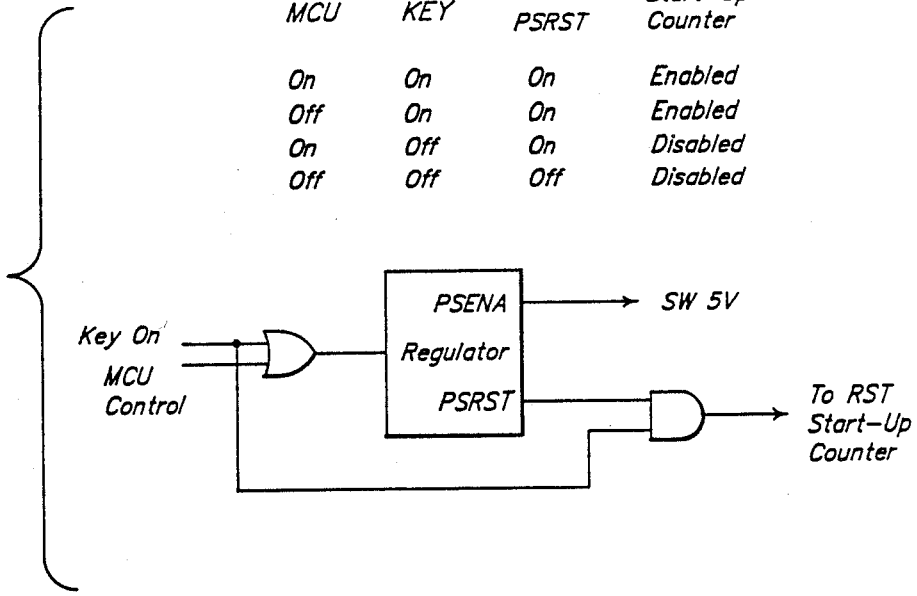
FIG. 32 is an equivalent circuit schematic diagram illustrating how a reset output of a voltage regulator can be used as a system low voltage inhibit.

This feature provides for increased system integrity by holding the MCU 3251 and the transmission controller 3010 in a predetermined RESET state under certain conditions including those shown in conjunction with FIG. 32.

Here a reset output is generated on the powering down of a switch. In other words, the "peripherals" are reset on power-up.

An "additional" RESET mode is provided by the regulator (as shown in FIG. 32) that must be gated out through the watchdog/reset circuit shown in FIG. 30; it also responds to the switching off of the second voltage regulator signal.

Another function of the WD cicuit Z127 is to divide the turbine speed signal "$N_t$" down so as to reduce the interrupt burden on the MCU. Accordingly, the WD circuit includes a programmable frequency divider 3732 which receives the turbine speed signal $N_t$. The divide control signals "DIVA" and "DIVB" from the MCU are used to determined one of four different divide ratios to be employed by the divider 3732.

It should be noted that the WD circuit includes a block 3734 which is labeled "prescaler/system clocks". This block comprises a timer with a prescaler which is used to provide both reset and start-up times, as well as the fault delay and window detector clock signals employed in the WD circuit.

The present invention has been described in an illustrative manner. It is to be understood that the terminology which has been used is intended to be in the nature of words of description rather than of limitation.

Obviously, many modifications and variations are possible in light of the above teachings. Therefore, the subject invention may be practiced otherwise than as specifically described.

What is claimed is:

1. Between electronic controllers, with dissimilar grounds, on a vehicle, including an engine control unit and a transmission control unit, a battery and a throttle position sensor, a circuit to share a signal from said throttle position sensor comprising:
   means for reading the output of said throttle position sensor with one of said controllers by referencing the output to the ground of that controller to generate an absolute throttle position sensor reading; and
   means for reading the output of said throttle position sensor with the other said controller via a differential amplifier to generate a relative throttle position sensor reading.

2. The circuit of claim 1 where the differential amplifier comprises a unity gain amplifier.

3. In a vehicle including engine and transmission controllers, a battery and a throttle position sensor, a circuit to share a signal from said throttle position sensor between said engine and transmission controllers having dissimilar grounds, comprising:
  means for reading the output of said throttle position sensor with one of said controllers by referencing the output to the ground of that controller to generate an absolute throttle position sensor reading; and
  means for reading the output of said throttle position sensor with the other said controller via a unity gain amplifier to generate a relative throttle position sensor reading.

* * * * *